(12) United States Patent
Ali

(10) Patent No.: US 11,236,525 B2
(45) Date of Patent: Feb. 1, 2022

(54) DOOR LOCKING DEVICE AND A SMART DOOR APPARATUS

(71) Applicant: Isameldin Omar Ali, London (GB)

(72) Inventor: Isameldin Omar Ali, London (GB)

(*) Notice: Subject to any disclaimer, the term of this patent is extended or adjusted under 35 U.S.C. 154(b) by 239 days.

(21) Appl. No.: 16/475,364

(22) PCT Filed: Feb. 6, 2018

(86) PCT No.: PCT/GB2018/050328
§ 371 (c)(1),
(2) Date: Jul. 1, 2019

(87) PCT Pub. No.: WO2018/146460
PCT Pub. Date: Aug. 16, 2018

(65) Prior Publication Data
US 2019/0338560 A1    Nov. 7, 2019

(30) Foreign Application Priority Data

Feb. 9, 2017    (GB) .................................... 1702142

(51) Int. Cl.
*E05B 45/06*    (2006.01)
*G07C 9/00*    (2020.01)
(Continued)

(52) U.S. Cl.
CPC .............. *E05B 45/06* (2013.01); *E05B 1/003* (2013.01); *E05B 17/0079* (2013.01);
(Continued)

(58) Field of Classification Search
CPC ...... E05B 45/06; E05B 1/003; E05B 17/0079; E05B 2001/0076; E05B 2045/0695;
(Continued)

(56) References Cited

U.S. PATENT DOCUMENTS

| 3,402,405 A | 9/1968 | Manuel |
| 4,465,997 A | 8/1984 | Hines |

(Continued)

FOREIGN PATENT DOCUMENTS

| EP | 1865129 | 12/2007 |
| WO | WO 2014172322 | 10/2014 |
| WO | WO 2015171388 | 11/2015 |

OTHER PUBLICATIONS

International Search Report and Written Opinion in related Application PCT/GB2018/050328, dated Jun. 28, 2018, 14 pages.

(Continued)

*Primary Examiner* — Thomas D Alunkal
(74) *Attorney, Agent, or Firm* — Bochner IP, PLLC; Andrew D. Bochner

(57) ABSTRACT

A door locking device for a smart door apparatus (10) is provided comprising an interior door handle positionable on an interior side of a door; an exterior door handle positionable on an exterior side of the door (14); a lock for the door (14) which is coupled to the interior door handle, the lock having a deadbolt which is activatable by actuation of the interior door handle; a controller for automatically generating an alert signal in the event of activation of the deadbolt; and a wireless communication module associated with the controller, the wireless communication module automatically transmitting the alert signal in the event of activation of the deadbolt.

11 Claims, 11 Drawing Sheets

(51) Int. Cl.
    *H04N 5/225*     (2006.01)
    *H04N 5/232*     (2006.01)
    *E05B 1/00*     (2006.01)
    *E05B 17/00*     (2006.01)
    *G08B 13/08*     (2006.01)

(52) U.S. Cl.
    CPC ......... *G07C 9/00563* (2013.01); *G08B 13/08* (2013.01); *H04N 5/2253* (2013.01); *H04N 5/23218* (2018.08); *E05B 2001/0076* (2013.01); *E05B 2045/0695* (2013.01)

(58) Field of Classification Search
    CPC ............. H04N 5/23218; H04N 5/2253; G07C 9/00563; G08B 13/08
    See application file for complete search history.

(56) References Cited

U.S. PATENT DOCUMENTS

| | | | |
|---|---|---|---|
| 5,311,168 A | 10/1994 | Pease, Jr. et al. | |
| 6,225,903 B1 | 5/2001 | Soloway | |
| 7,158,029 B1 * | 1/2007 | Martyn | E05B 45/083 200/19.35 |
| 8,674,832 B1 * | 3/2014 | Thomas | E05B 45/06 340/542 |
| 2006/0191303 A1 | 8/2006 | Shvarts | |
| 2010/0313612 A1 * | 12/2010 | Eichenstein | E05B 41/00 70/124 |
| 2011/0067822 A1 | 3/2011 | Cole et al. | |
| 2012/0044049 A1 | 2/2012 | Vig et al. | |
| 2012/0073338 A1 * | 3/2012 | Mohla | E05B 47/0012 70/124 |
| 2015/0027178 A1 * | 1/2015 | Scalisi | H04N 7/188 70/277 |
| 2016/0247340 A1 * | 8/2016 | Mahar | G07C 9/38 |
| 2016/0275739 A1 * | 9/2016 | Scalisi | G07C 9/00571 |

OTHER PUBLICATIONS

UKIPO Search Report under Section 17, 3 pages.
UKIPO Examination Report under Section 18(3), dated Sep. 4, 2018, 2 pages.
UKIPO Further Search Report under Section 17, 2 pages.

* cited by examiner

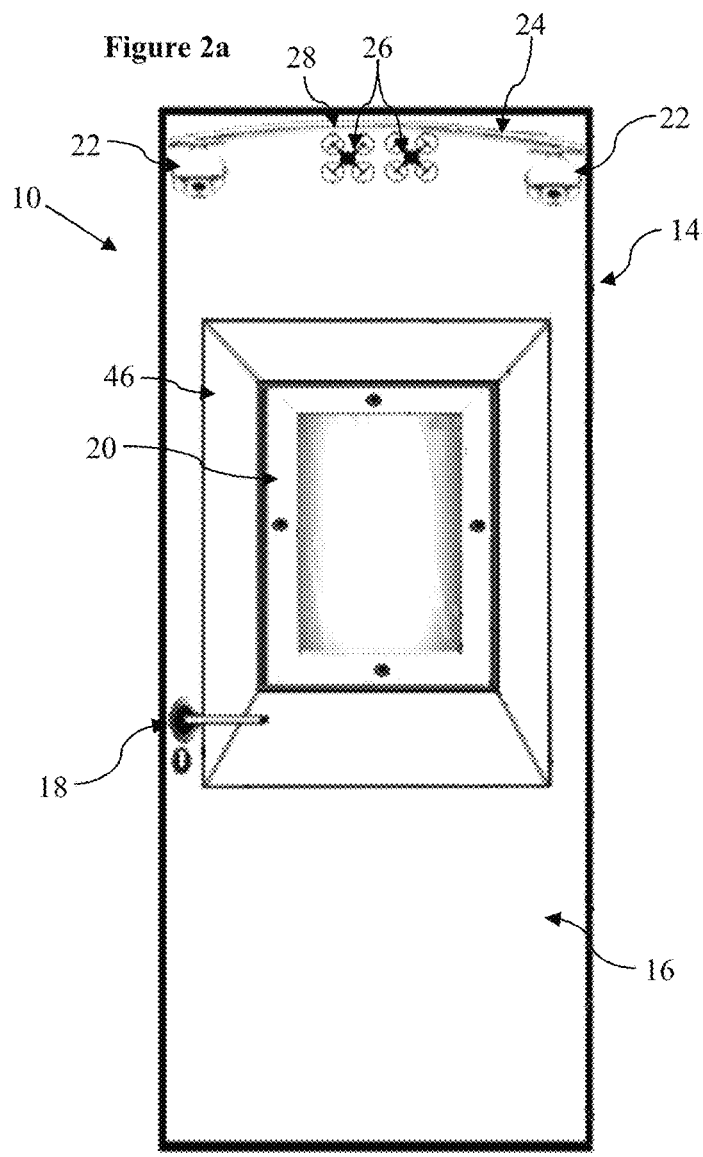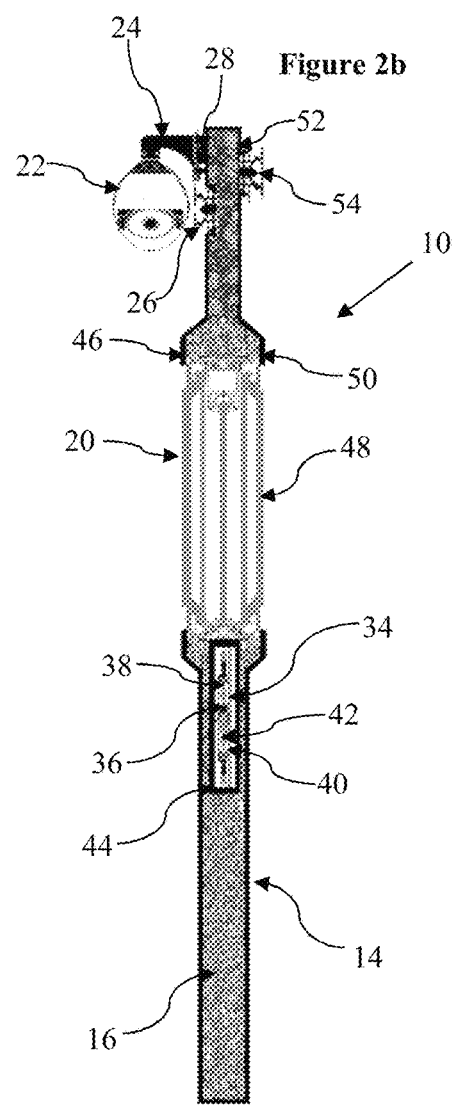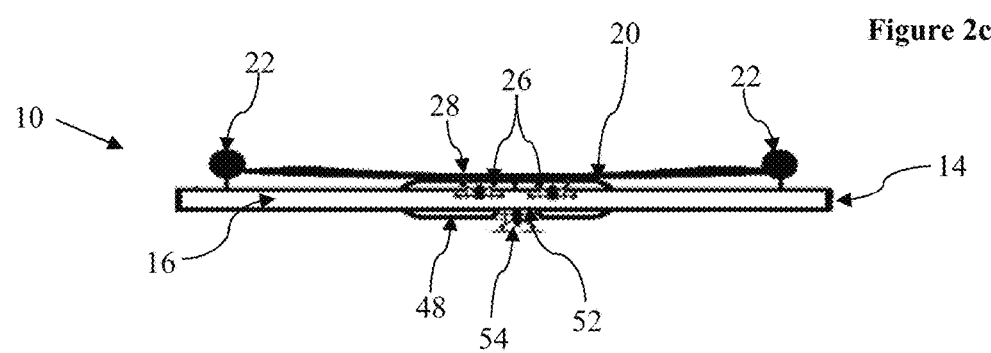

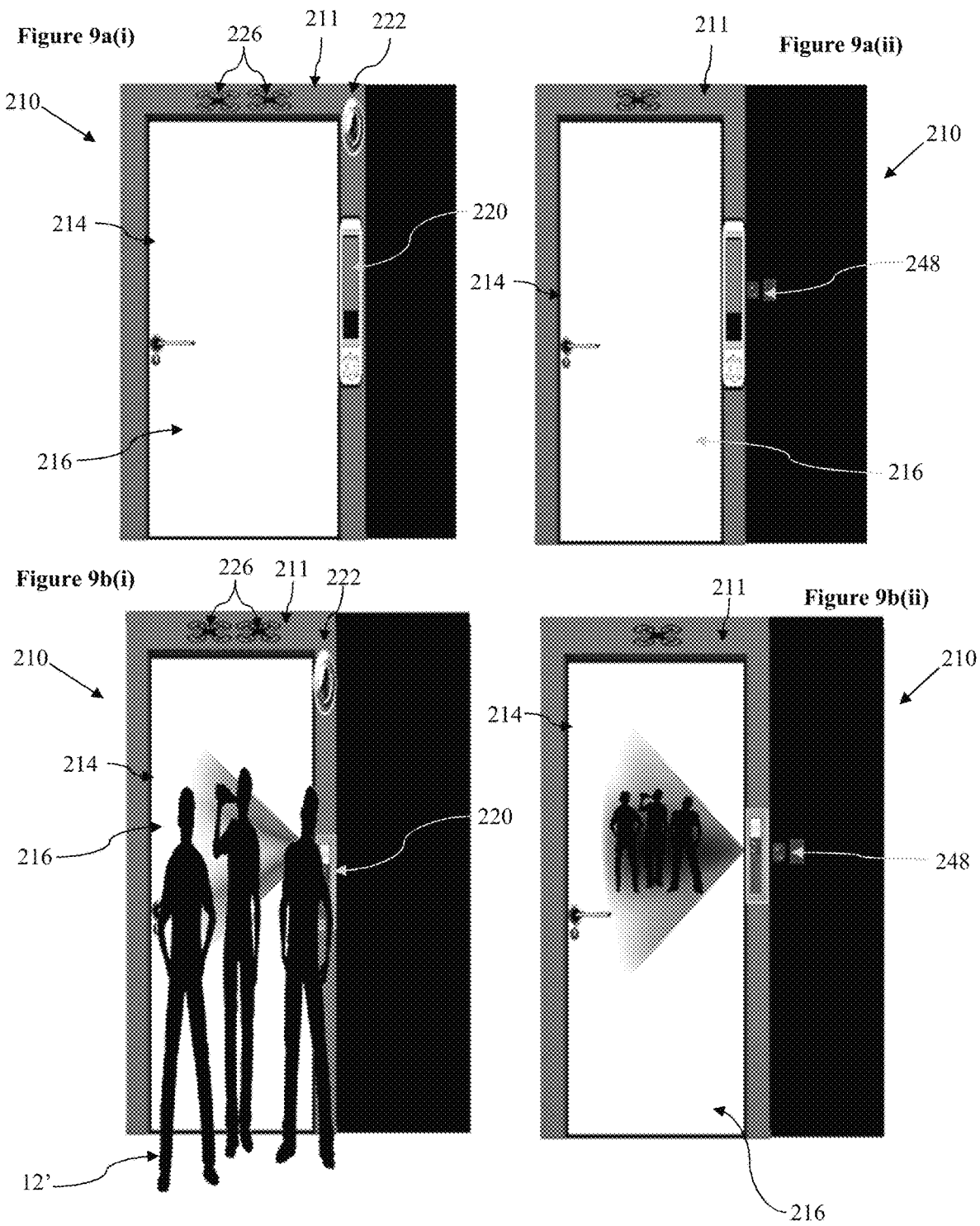

DOOR LOCKING DEVICE AND A SMART DOOR APPARATUS

The present invention relates to a smart door apparatus for improved security for a property. The invention further relates to a smart door network system having a plurality of interconnected said smart door apparatuses. The invention also relates to a door locking device for a smart door apparatus. A property management system, method of screening a prospective tenant and/or landlord of a property, and method of monitoring an individual at or adjacent to a property are also provided.

The front door of any premises is the point of access of a building, serving as a barrier between an internal safe space and the outside world. One of the difficulties, however, for the occupier of a building, is being able to adequately identify a caller at the door in advance of opening the door, thereby presenting a potential risk to the safety of the occupier if the caller is unknown to them.

Where the identity of a caller cannot be determined, there is always a risk, however small, that the occupant of the property may be putting themselves in danger when opening their door. This may be of particular importance during a manhunt, shooting or terrorist scenario, when a dangerous individual may be loose in an area and is attempting to forcibly obtain access to a property.

Furthermore, where a crime has been committed at a front door of a property, there is often insufficient evidence which can be gleaned from the incident in order to identify and find the perpetrator. Even where security cameras are present, criminals can often find ways of obscuring their visage from the cameras, such that no usable evidence is left at the scene of a crime.

Identity theft is also an ever-increasing risk. In particular, one possible scam is that in which deposits and rental payments are made by tenants to fraudulent prospective landlords. A fraudster, impersonating a landlord, may offer a rental property at a very cheap rate, usually via the internet, but requiring an upfront deposit. Often, the fraudster will target a property known to be empty, will force entry to the property, change the locks, and start marketing the property to prospective tenants, collecting large deposits without ever letting the property. To the prospective tenants, the landlord appears legitimate, since they are able to access the property without issue. This problem is exacerbated by the increase in false letting agent documents which have been prepared to improve the appearance of the con. Whilst prospective landlords are able to access large amounts of detail regarding prospective tenants, the reverse is not true.

The present invention seeks to provide an improved means by which access to a property can be achieved, whilst improving security for an occupant of the property.

According to a first aspect of the invention, there is provided a smart door apparatus comprising: a door having a door body and a handle on the door body for opening and/or closing the door; an image capture device mounted at or adjacent to an external side of the door which is arranged to image a person at the external side of the door; a power supply associated with the door body and which powers at least the image capture device; a display element which is in communication with the image capture device to display an image of the person at the external side of the door to a user of the smart door apparatus; a visitor access element via which the person at the external side of the door may request entry through the door; a wireless communication means arranged to receive information regarding the person on the external side of the door from a remote source; and an identity verification circuit in communication with the display element and the wireless communication means which is able to provide verification information to the user of the smart door apparatus regarding the identity of the person at the external side of the door.

The provision of verification of a visitor's identity at a smart door apparatus allows for the user to be more certain as to whether or not they should permit or deny access to a property, and whether or not the visitor is acting on legitimate grounds. Furthermore, automatic verification of the identity of the visitor may allow a remote user to permit the visitor access to the property without needing the user's physical presence.

Preferably, the wireless communication means may be in communication with the image capture device, the wireless communication means being arranged to transmit a captured image of the person at the external side of the door to the remote source in order to retrieve information regarding said person. Real-time transmission of an image of the visitor to the user can assist with verification of the visitor's identity, particularly where the user is remote from the door. The user may, for example, be able to view the visitor remotely on their smart device and thereby authorise or deny access to the property from the smart device.

Optionally, the apparatus may further comprise at least one biometric sensor, the or each biometric sensor being configured to retrieve identifying data relating to the person at the external side of the door. Preferably, the at least one biometric sensor may comprise any or all of: a fingerprint sensor; a thermal imaging sensor; an iris scanning sensor; and a facial recognition sensor. Biometric scanners and sensors can assist with the accuracy of the verification of the identity of the visitor to the property, ensuring that the user can confidently determine whether the visitor is who they purport to be.

In one embodiment, the image capture device may include an actuator and position sensor, the actuator being arranged to actuate the image capture device to a preferred imaging position to capture an image of the person at the external side of the door. Preferably, the image capture device may include a pivotable universal joint. Furthermore, a plurality of image capture devices may be provided. The provision of an image capture arrangement which is able to provide as much coverage of the area surrounding the exterior side of the door improves the ability to accurately verify the identity of the visitor, and also provides more information to the user as to the activities of the visitor, should they be untoward.

The apparatus may further comprise at least one further image capture device, the or each image capture device being provided to monitor an interior area of a building or room with which the door is associated. The provision of internal image capture devices within a property allows the smart door apparatus to be used to monitor the state of repair of the property over time, and/or to inventorise the property. This is of particular use for rental properties with a relatively high turnover of tenants, for instance.

Preferably, there may be provided at least one unmanned aerial vehicle, the or each unmanned aerial vehicle having an onboard image capture device, and at least one controller which is in communication with the or each unmanned aerial device. The provision of unmanned aerial vehicles expands the viewing range of the smart door apparatus, again improving the ability to monitor and/or identify visitors to a property. In particular, if the visitor is unknown and likely to have criminal intent, the provision of unmanned aerial vehicle imaging may offer the best possible option for identification of the individual responsible for a crime.

In one embodiment, there may be provided at least one environmental sensor which is in communication with the wireless communication means for determining an environmental status inside or outside of the building. The at least one environmental sensor may comprise any or all of: weather sensors; air quality sensors; temperature sensors; radiation sensors; earthquake sensors; water level sensors. The provision of sensors outside of a property may provide an occupant with information regarding the conditions outside, which may help them to make decisions regarding, for example, clothing choices, modes of transport to use, and so on. Alternatively, the sensors can act to build a historical picture of the state of a property over a prolonged period of time, which may be of use to potential buyers or tenants of a particular property. Similarly, the provision of environmental sensors which are indicative of the presence of, for instance, air pollution, may be of great benefit to individuals having heart disease, coronary artery disease, congestive heart failure, lung diseases, asthma, emphysema, chronic obstructive pulmonary disorder, and/or pregnant women, since air pollution can have a significant adverse effect on such individuals.

Optionally, the smart door apparatus may comprise at least one activatable alarm device. The provision of an alarm device as part of the smart door apparatus may serve to discourage miscreants from harassing the occupant of a property having said door. The alarm may be audible or visual, or could take the form of a distress signal to a third party in order to summon assistance for the harassed occupant.

In one embodiment, the visitor access element may comprise an external display element which is positioned on an exterior surface of the door body. Preferably, the said display element may be positioned on an interior surface of the door body which is opposite the external display element. Furthermore, the external display element may be a touchscreen display device, and the touchscreen display device may optionally comprise a touchscreen doorbell interface. The provision of a display element on the exterior of the door allows for an intuitive command input arrangement to be provided for a visitor to a door, as well as permitting real-time teleconferencing to occur between the user of the smart door apparatus and the visitor without needing to open the door.

In one preferred embodiment, the handle may comprise a secondary controller which is independent of the identity verification circuit. The provision of a secondary controller in the handle allows for alerts and/or commands to be generated by the handle independently of the main door. In some scenarios, it may be advantageous for the handle to be independently operable of the door, in particular in lockdown situations, as this may allow an action at the handle to generate a distress signal which can be readily transmitted to a third party for actioning.

The smart door apparatus may further comprise a contract generation and signing circuit which is in communication with the identity verification circuit for allowing concurrent identification of a person signing a contract at the smart door apparatus. Additionally or alternatively, there may be provided an address verification circuit which is in communication with the identity verification circuit for providing a certified proof of address for a user of the smart door apparatus associated with a property. The ability for a contract, such as a tenancy agreement to be signed at the smart door apparatus, whilst simultaneously verifying the identity of the individual doing the signing, allows for the other party or parties to the contract to be certain of the identity of the person signing the contract. This limits the danger of bogus tenants and/or landlords from entering into illegitimate contracts, limiting the risk of a fraud occurring. An address verification circuit may advantageously simplify the mechanism by which a proof of address may be created and verified for an occupant of a property.

Preferably, there is provided an onboard door processor which is mounted within the door body, the identity verification circuit being part of the onboard door processor. There may also be provided a cooling means mounted within the door body and which is adapted for cooling the onboard door processor. Furthermore, the power supply is mounted within the door body. The provision of a local processor onboard the door allows for the smart door apparatus to largely perform the identity verification locally, which may simplify permission of access for common visitors without requiring the transmission of any data wirelessly, which may otherwise slow the authorisation process. For example, landlord, tenant and occupant profiles for a given smart door apparatus may be more sensibly locally stored in the memory of the door.

The display element may comprise a smart projector device which is in wireless communication with the image capture device and is arranged to project the image of the person at the external side of the door to a user of the smart door apparatus. The provision of an indirect representation of the visitor to the smart door apparatus allows the user to determine whether they are content to authorise the entry of the visitor to the property without necessarily themselves being present at the door.

In one further embodiment, the display element may comprise a handheld user device which is in wireless communication with the image capture device and is arranged to display the image of the person at the external side of the door to a user of the smart door apparatus via a display screen of the handheld user device. The provision of a smart device, such as a tablet computer or a smart phone, allows a user of the smart door apparatus to remotely permit access to the property having visually identified the visitor and also visibly reviewed the results of the identity verification process as determined by the smart door apparatus.

According to a second aspect of the invention, there is provided a smart door network system comprising: a plurality of smart door apparatuses in accordance with the first aspect of the invention; and a central server with which the plurality of smart door apparatuses are communicable; wherein a plurality of individual user profiles associated with the plurality of smart door apparatuses are stored and retrievable from the central server, the identity verification circuits of each smart door apparatus being able to verify an identity of a person at the smart door apparatus based on a corresponding individual user profile.

By interconnecting the smart door apparatuses as part of a greater network allows for user profiles to be shared and/or collated between many different apparatuses. This drastically improves the ability of any given smart door apparatus to correctly identify the identity of a visitor based on user profiles taken from many different sources.

Preferably, the central server may be provided at a dedicated monitoring centre, the monitoring centre being configured to respond in the event of an alert being raised by any of the plurality of smart door apparatuses. The monitoring centre allows for all of the smart door apparatuses to be monitored in real-time, ensuring that, in the event of a distress call, an appropriate response can be raised. Furthermore, it may also be able to significantly reduce the administrative burden for the running of a property, as a great many tasks can be outsourced to the monitoring centre, not least the provision of additional background checks on tenants and/or visitors to a property for the benefit of a landlord.

According to a third aspect of the invention, there is provided a door locking device for a smart door apparatus, the door locking device comprising: an interior door handle positionable on an interior side of a door; an exterior door handle positionable on an exterior side of the door; a lock for the door which is coupled to the interior door handle, the lock having a deadbolt which is activatable by actuation of the interior door handle; a controller for automatically generating an alert signal in the event of activation of the deadbolt; and a wireless communication module associated with the controller, the wireless communication module automatically transmitting the alert signal in the event of activation of the deadbolt.

The provision of a dedicated handle for the door which can be activated from an interior of the door to automatically engage a dead bolt allows for a door, such as that of a smart door apparatus, to be placed into lockdown. This is of particular importance in the event of an emergency, when there may be a specific reason that a user may wish to provide extra security at the property for a certain period of time. For example, in instances of domestic abuse, a violent partner may harass their estranged spouse, and attempt to gain access to their property. The present locking arrangement can effectively turn the property into a panic room, in such an instance, whilst also being adapted to automatically send a distress signal which can rally help to the user.

The controller may further comprise a timing circuit, the controller automatically disengaging the deadbolt after a predetermined duration defined by the timing circuit. The handle can be adapted so as to lock down the door for a predetermined duration, which can provide peace of mind for the user for a certain amount of time. A dangerous individual, when finding that their access to a property is blocked, is more likely to leave, thereby rendering automatic deactivation of the deadbolt relatively safe.

In one preferred embodiment, the predetermined duration may be re-activatable upon repeated actuation of the interior door handle. The ability to reactivate the period of deactivation of the exterior door handle may be necessary if the initial period of deactivation has been insufficient to ward off the potential intruder. As such, it will be advantageous to provide a mechanism for extending the duration of the engagement of the deadbolt.

The door locking device may further comprise at least one indicator element which is indicative of a remaining duration until disengagement of the deadbolt. Such an indicator element is able to readily display to the user the period for which they are definitively secure in their property, and also allowing them to know as and when they may need to reactivate their protection, should the threat not have dissipated.

Preferably, the activation of the deadbolt may be effected by counter-rotation of the interior door handle into a vertical or substantially vertical condition. One possible activation arrangement for the locking device is by counter-rotation of the interior handle, that is, in the direction counter to the normal direction of operation. This ensures that a user will not accidently engage the deadbolt, and therefore unintentionally lock themselves into the property and alert the relevant authorities.

Optionally, there may be provided an override element for manual override of the deadbolt of the device. It is foreseeable that any danger which requires the user to activate the deadbolt may vanish for the expiry of the pre-determined duration, in which case, it is advantageous to provide the user with a means of disengaging the deadbolt before the expiry of said duration.

Preferably, the controller may be mounted inside the interior door handle, and further comprising a dedicated power supply for the controller which is also mounted inside the interior door handle. By providing the controller inside the interior handle, the possibility of an intruder physically disabling the controller from the outside of the smart door apparatus is significantly diminished.

The device may further comprise an image capture device associated with the exterior door handle to permit a user to monitor an individual at or adjacent to the exterior door handle. Image capture of the individual on the exterior side of the door may advantageously provide a means of identification of said individual. This may allow for an appropriate response to the distress signal to be effected. For example, if the individual is identified as a wanted criminal, the police could be automatically summoned to the location.

Preferably, an image capture device may be associated with the interior door handle to permit video communications with the user, and said image capture device may be mounted in the interior door handle. Imaging of the user can improve communications with either the visitor or a third party, such as the monitoring centre.

Preferably, there may be provided a communications means to permit at least audio communication between the interior and exterior sides of the door. The provision of a means of corresponding with the person on the exterior side of the door may allow the user to explain the situation, attempt to reason with the individual, and/or attempt to delay the dangerous individual whilst assistance is en route, all whilst maintaining the security of the user.

In one preferred embodiment, the device may further comprise a memory storage device associated with the controller, the memory storage device being adapted to store at least one contact profile containing contact details for the wireless communication module to automatically contact in the event of activation of the deadbolt. The user may have a preferred database of contacts who should be alerted in an emergency. This information could be stored at the controller in order that these individuals be automatically contacted in the event of the deadbolt being activated by the user.

According to a fourth aspect of the invention, there is provided a property management system comprising: a smart door apparatus, preferably in accordance with the first aspect of the invention; and at least one property sensor which is positionable inside a property and is in communication with the wireless communication means of the smart door apparatus: the at least one property sensor being adapted to optically image at least a portion of the property for inventorisation and/or to determine a state of repair of the property.

Preferably, the at least one property sensor may comprise at least one unmanned aerial vehicle having an onboard optical image capture device. Additionally, or alternatively, the at least one property sensor comprises a plurality of fixed image capture devices positioned throughout the property. The interaction between a smart door, which could be readily used for activating a tenancy arrangement between a landlord and a tenant, and any sensors within the property can advantageously simplify the process of inventorisation of the property and/or monitoring of the state of the property to determine when repairs are required. This may advantageously provide the landlord with the ability to completely manage the property via the smart door apparatus, thereby significantly reducing the administrative burden for the landlord, whilst also providing greater evidential weight in any disputes, for instance, regarding the return of deposits or damage to fixtures and furnishings during a tenancy.

According to a fifth aspect of the invention, there is provided a method of screening a prospective tenant and/or landlord of a property, the method comprising the steps of: a] providing a smart door apparatus, preferably in accordance with the first aspect of the invention, and associating at least one tenant and/or landlord user profile therewith; b] using the identity verification circuit, determining that an individual at or adjacent to the smart door apparatus is an individual associated with the a said tenant or landlord profile; and c] providing access privileges to the smart door apparatus associated with the said tenant or landlord profile, once verification of the individual's identity has been completed by the identity verification circuit.

The present invention is particularly useful in the context of facilitating landlord-tenant interactions. The screening of a potential tenant at the smart door apparatus and then verifying their resultant user profile not only limits the possibility of fraudulent letting or rental of a property, but also significantly reduces the administrative burden presented to the landlord which would otherwise be associated with background checks. The invention may also allow the landlord to directly manage their own property, eliminating the need for letting or rental agents, thereby reducing the maintenance cost of the property, which in turn may reduce rental costs for the tenant. The resultant reduction in paper-based administration may also advantageously lead to a reduction in associated carbon and/or $CO_2$ emissions associated with the property, associated with the reduction in paper usage as a result of the provision of the smart door apparatus.

There may also further comprise a step b] (i) which precedes step c], of providing a contract generation and signing circuit with the smart door apparatus which is in communication with the identity verification circuit for allowing concurrent identification of an individual signing a contract at the smart door apparatus, and during step c] associating access privileges based on the signed contract. Similarly, the ability for the tenancy agreement to be signed at the smart door apparatus, and indeed a bespoke contract generated by the smart door apparatus, ensures that the correct person, whose identity has been verified, is indeed taking on the tenancy agreement.

According to a sixth aspect of the invention, there is provided a method of monitoring an individual at or adjacent to a property, the method comprising the steps of: a] providing a property having a smart door apparatus in accordance with the first aspect of the invention: b] attempting to verify an identity of the individual using the identity verification circuit; and if the identity of the individual cannot be verified, step c] automatically activating at least one optical capture device to monitor the individual.

Preferably, during step c], the optical capture device may be provided onboard an unmanned aerial vehicle which is in communication with the smart door apparatus.

The ability to monitor individuals at a door, based on a result of an identity verification process, may beneficially reduce the propensity for a given property to fall victim to criminal activity, since the criminal will find it more difficult to conceal their identity from the user. Additionally, where a crime has been committed, the present arrangement will simplify the identification of the criminal in order to bring them to justice more readily. The monitoring of individuals could also be used to deter antisocial behaviour in residential areas, for example, by, for example, monitoring street revellers and or instigators of loud noise disturbances in a neighbourhood.

The invention will now be more particularly described, by way of example only, with reference to the accompanying drawings, in which:

FIG. 1*a* shows a front representation of a person encountering the exterior side of a first embodiment of a smart door apparatus in accordance with the first aspect of the invention:

FIG. 1*b* shows a first embodiment of a user interface for a doorbell of the smart door apparatus shown in FIG. 1*a;*

FIG. 1*c* shows a second embodiment of a user interface for a doorbell of the smart door apparatus shown in FIG. 1*a*

FIG. 1*d* shows a third embodiment of a user interface for a doorbell of the smart door apparatus shown in FIG. 1*a*

FIG. 1*e* shows a fourth embodiment of a user interface for a doorbell of the smart door apparatus shown in FIG. 1*a*

FIG. 1*f* shows a fifth embodiment of a user interface for a doorbell of the smart door apparatus shown in FIG. 1*a;*

FIG. 2*a* shows a front representation of the smart door apparatus of FIG. 1*a;*

FIG. 2*b* shows a central vertical cross-section through the smart door apparatus of FIG. 2*a;*

FIG. 2*c* shows a plan view of the smart door apparatus of FIG. 2*a;*

FIGS. 3*a* to 3*g* show representation of a display element for use as part of a smart door apparatus in accordance with the first aspect of the invention;

FIG. 4*a* shows a known person approaching a house having a smart door apparatus in accordance with the first aspect of the invention;

FIG. 4*b* shows a projection of a captured image of the known person via a display element as part of the smart door apparatus of FIG. 4*a;*

FIG. 4*c* shows the transmission of control information relating to the smart door apparatus of FIG. 4*a* to a user's smart device;

FIG. 4*d* shows the opening of the smart door apparatus of FIG. 4*a* following user verification of the known person's identity;

FIG. 5*a* shows a group of unknown persons approaching a house having a smart door apparatus in accordance with the first aspect of the invention;

FIG. 5*b* shows a projection of a captured image of the group of unknown persons via a display element as part of the smart door apparatus of FIG. 5*a;*

FIGS. 5*c* and 5*d* show the querying of the identity of the group of unknown persons by the user;

FIG. 5*e* shows the user issuing a command to unmanned aerial vehicles to monitor the group of unknown persons, following unsuccessful verification of the identity of the group of unknown persons;

FIG. 5*f* shows the monitoring of the group of unknown persons via the unmanned aerial vehicles;

Figure 1A:
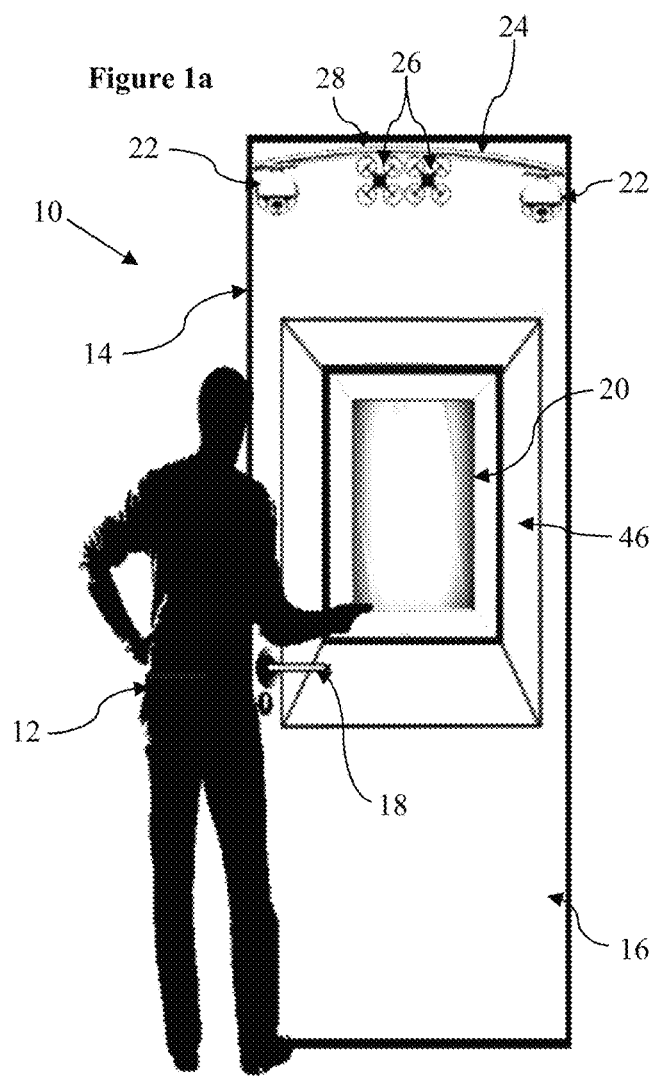
Figure 8A:
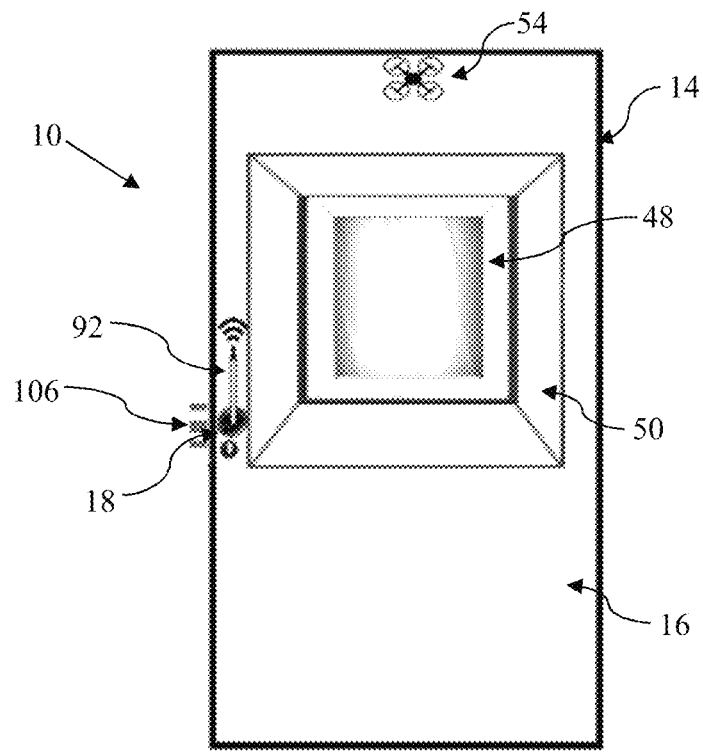
Figure 8B:
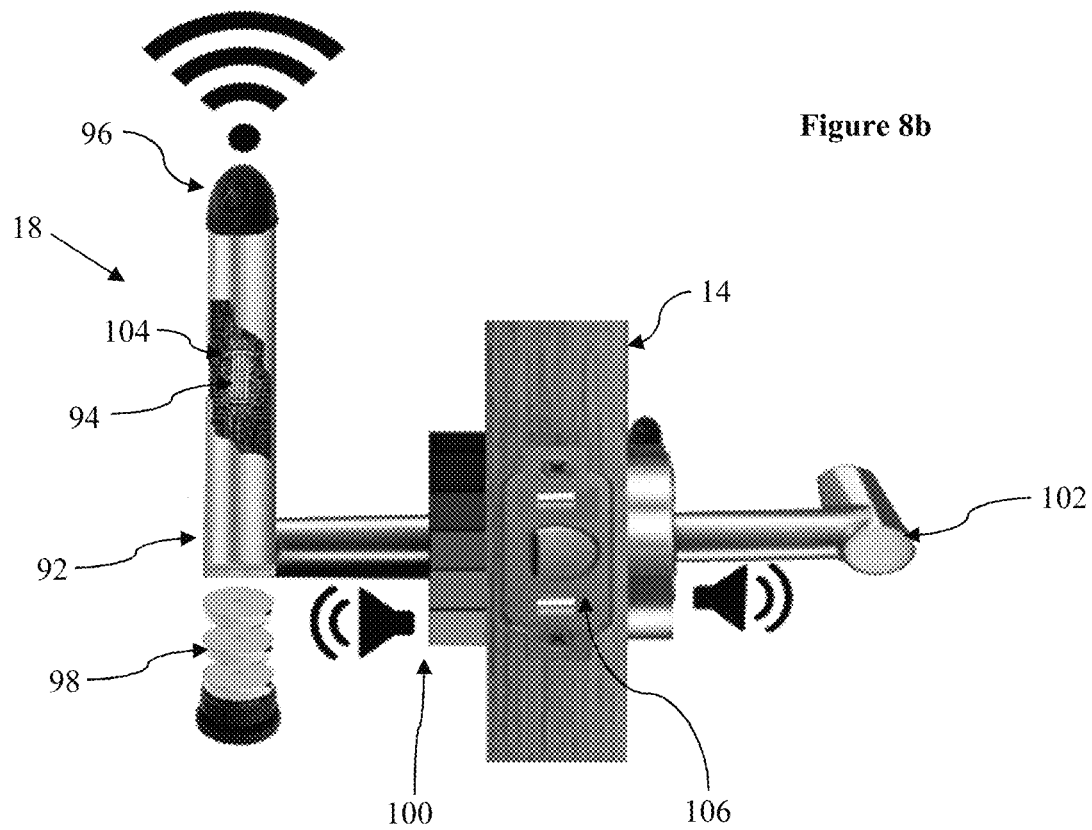
Figure 8C:
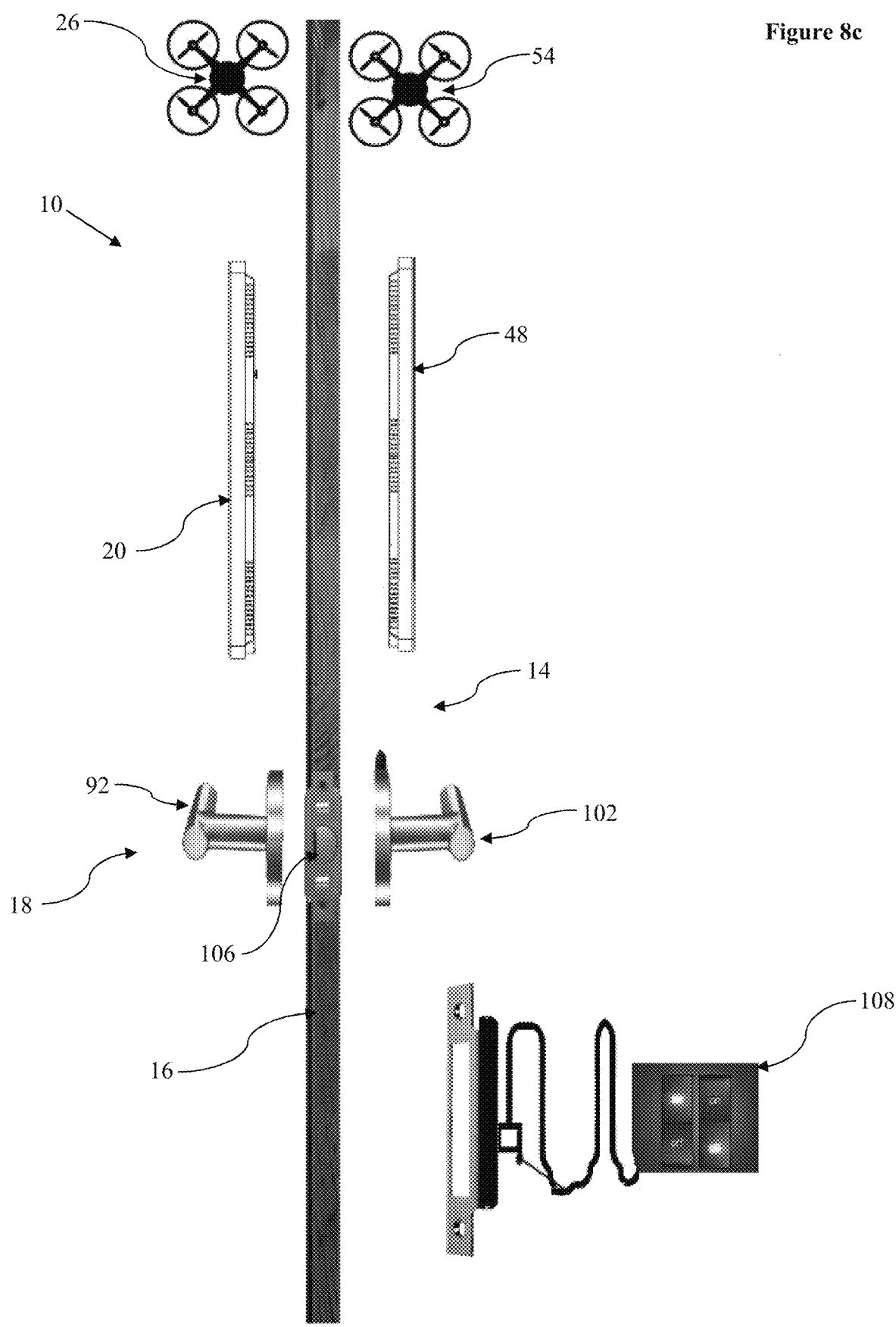
Figure 10:
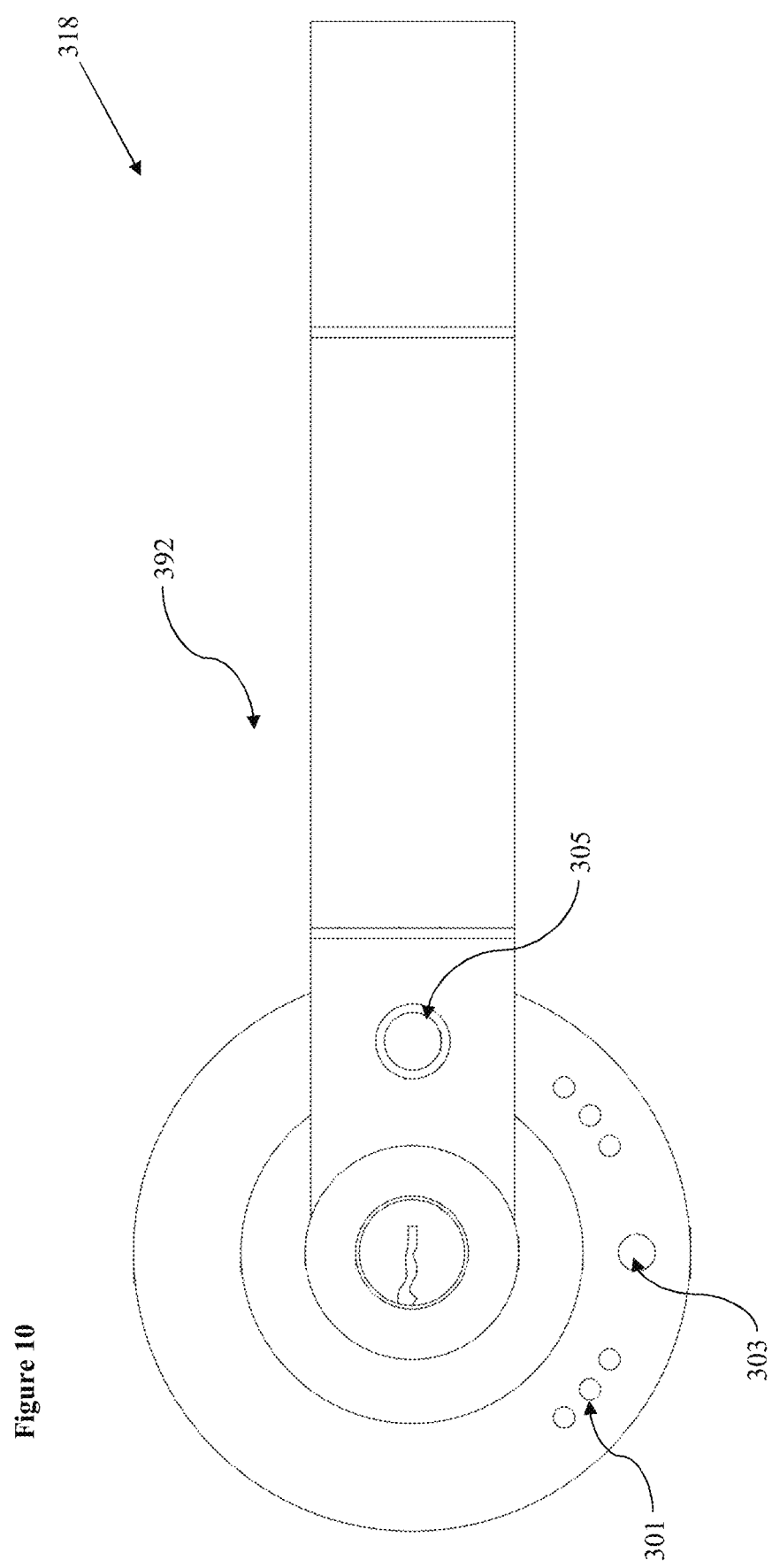

FIG. 8*a* shows a view of an interior face of the smart door apparatus of FIG. 1*a* in accordance with the first aspect of the invention;

FIG. 8b shows a side representation of one embodiment of a smart handle in accordance with the third aspect of the invention;

FIG. 8c shows an exploded cross-section through the smart door apparatus of FIG. 8a;

FIG. 9a(i) shows an exterior view of a second embodiment of a smart door apparatus in accordance with the first aspect of the invention;

FIG. 9a(ii) shows an interior view of the smart door apparatus illustrated in FIG. 9a(i);

FIG. 9b(i) shows the exterior view of the smart door apparatus of FIG. 9a(i) with a group of unmown persons m the process of being identified;

FIG. 9b(ii) shows the interior view of the smart door apparatus illustrated in FIG. 9b(i); and FIG. 10 shows as second embodiment of a smart handle in accordance with the third aspect of the invention.

Referring to FIG. 1a, there is illustrated a computerised or smart door apparatus, indicated globally at 10, and a visitor 12 is attempting to gain access through the smart door apparatus 10 to another area. It will be appreciated that the term visitor 12 can be used to apply to any individual at the smart door apparatus 10, including but not limited to a contractor, landlord, business employee, tenant, guest, attendee, invitee, lodger, family member, friend, or other individual who might approach a property. The smart door apparatus 10 could feasibly be associated with any sort of appropriate premises, including but not limited to a house, home, residence, property, dwelling, abode, habitat, domicile, quarters, building, school, office, shop, or any type of structure configured to accommodate people for living, work or study, or any other use. As such, these terms may be interchangeably used throughout the following description.

The smart door apparatus 10 comprises a door 14 having door body 16 and a handle 18 which is positioned on the door body 16 to allow the door 14 to be operated. In the depicted embodiment, there is provided a visitor access element which allows the visitor 12 to request access through the door 14, which is provided as an exterior display screen 20, preferably being touchscreen enabled to allow the visitor 12 to enter requests to the smart door apparatus 10.

The exterior display screen 20 may be obscured in direct sunlight, and therefore may be provided as a display screen utilising reflected light to create a readable display effect in any light. The brighter the ambient light, the brighter the display. This may help to reduce the energy consumption of the smart door apparatus 10. The exterior display screen 20 may therefore be provided as a sunlight readable LCD, transflective LCD, optical bonding LCD or high brightness LCD screen. The exterior display screen 20 may be provided as a curved or flat screen, depending upon the shape or size of the door 14.

The smart door apparatus 10 includes at least one image capture device, here provided as two pivotable cameras 22 which are mounted preferably to an upper edge of the door body 16. It will be apparent, however, that such image capture devices could be provided at or adjacent to the door 14 itself, for example, in a door frame or on other supporting objects around the door 14. The cameras 22 are here mounted via a dedicated camera support bracket 24, mounted at an upper portion of the door body 16. There may also be provided one or more unmanned aerial vehicles 26 associated with the smart door apparatus 10, each of which including an onboard image capture device. Here, the unmanned aerial vehicles 26, of which two mini-drones or quadcopters are shown, may be engagable with a UAV dock 28 which may be provided, for example, as part of the camera support bracket 24.

The cameras 22 may preferably be provided as 360°-degree panoramic cameras, and may be provided with an actuator which allows them to track the position of the visitor 12. For example, the cameras 22 may preferably attempt to obtain facial image data relating to the visitor 12, and therefore the or each actuator may be optimized in order to best track the facial position of the visitor 12 in order to obtain the most accurate facial information data. One or more motion sensors may also be provided in order to assist with positional tracking of the visitor 12.

A plurality of cameras 22 may be provided in order to fully image the area at or adjacent to the front of the door 14 in a 360°-degree field-of-view. The plurality of cameras 22 may then be linked with the motion sensors in order to be able to maintain full visual awareness of the surroundings. The motion sensors may be able to detect moving objects, particularly people, so as to alert the user 30 to the presence of, for example, a potential intruder. There may also be provided one or more audio communication means which may allow a user 30 to communicate verbally with a visitor, upon detection of the presence of an individual at the door 14. Similarly, the motion sensors could be configured so as to be conditionally activating, that is, that other displays may be triggered at the exterior display screen 20 only upon the detection of the presence of an individual. For example, the user interface of the exterior display screen 20 may only become active upon detection of a presence at the door 14.

Other sensors could also be provided which are inbuilt to the smart door 14. For example, environmental monitoring may be advantageous, including, but not necessarily limited to: weather sensors; air quality sensors; temperature sensors; radiation sensors; earthquake sensors; water level sensors; etc. Alternatively, there may be provided one or more smart door apparatus status sensors, which can transmit diagnostic data to a maintenance technician should there be any operational issues with the smart door apparatus 10.

Figure 1B:
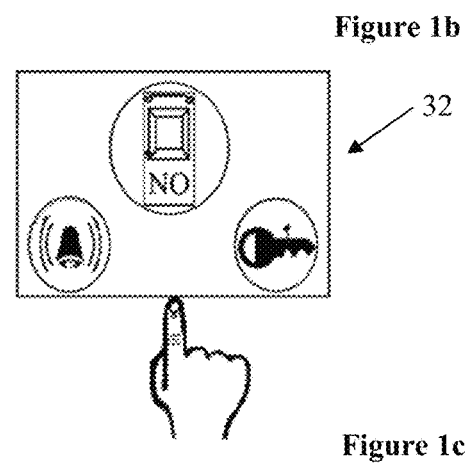

A variety of options for the visitor 12 at the exterior display screen 20 are shown in FIGS. 1b to 1f. In FIG. 1b, three potential options are shown on a user interface 32 of the exterior display screen 20: the visitor 12 may choose to ring a doorbell; they may choose to directly call a particular dwelling, for example, an apartment within a block of flats: or they may attempt to unlock the door 14 electronically.

Figure 1C:
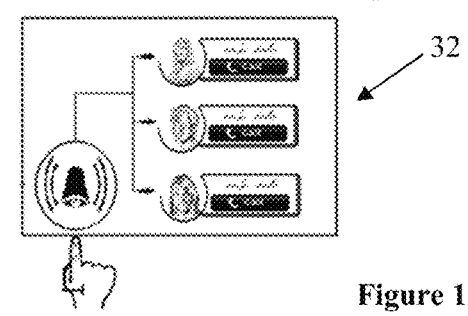
Figure 1D:
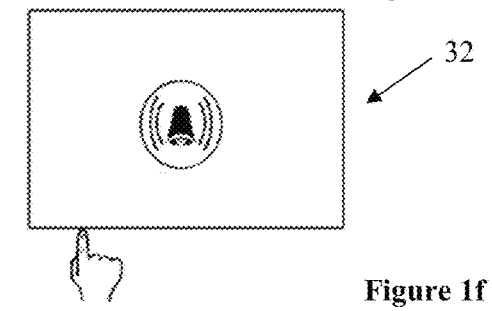

In FIGS. 1c and 1d, a known or expected visitor's 12 attempts to ring a doorbell are shown. Following verification of the visitor's 12 identity using the identity verification circuit 40, the known or expected visitor 12 may be provided with the option to directly alert a particular known user of the smart door apparatus 10. This option may only be available where the identity of the visitor 12 has first been approved, for example, via manual authorisation by the user when the image of the visitor 12 has been displayed alongside the verification of their identity. Where the user of the smart door apparatus 10 has associated one or more smart devices with the smart door apparatus 10, then the visitor 12 may be provided with the option to directly alert a particular smart device, as shown in FIG. 1c. Alternatively, they may activate a standard doorbell, as per FIG. 1d. This may be to only option for an unknown visitor, for example, thereby protecting the contact details of the user.

Figure 1E:
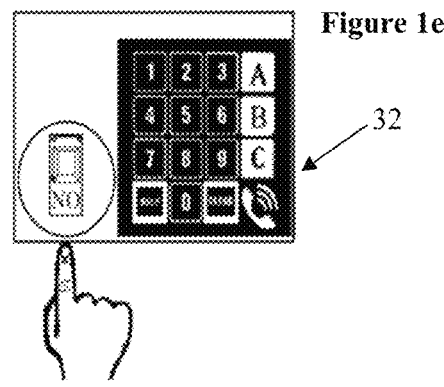
Figure 1F:
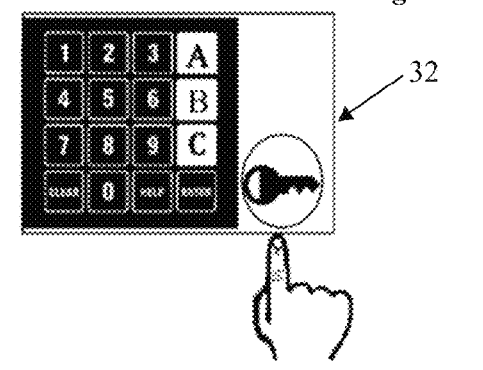
Figure 3A:
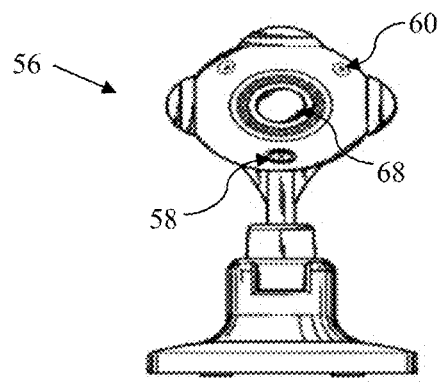
Figure 3D:
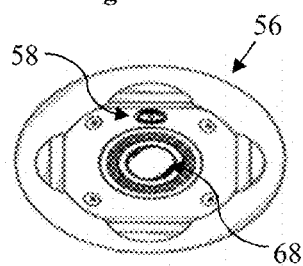
Figure 3E:
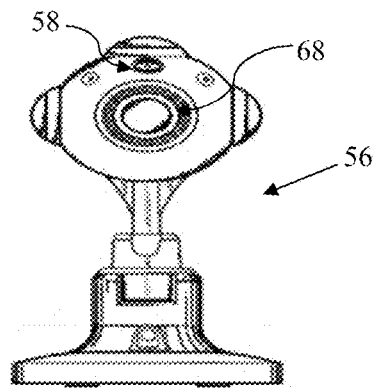
Figure 3B:
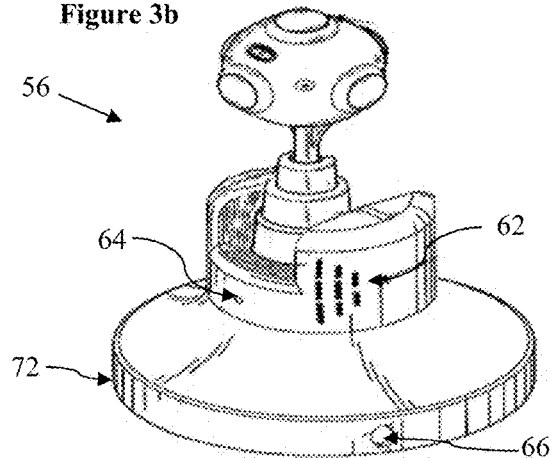
Figure 3F:
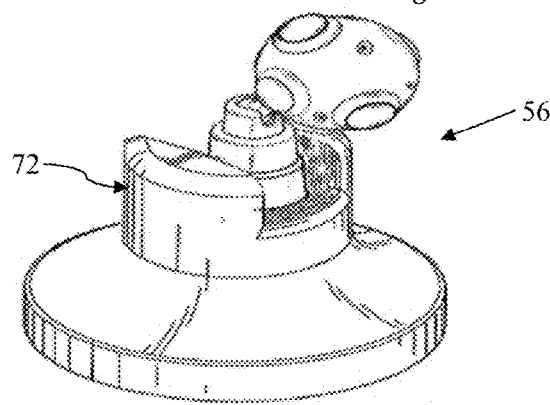
Figure 3C:
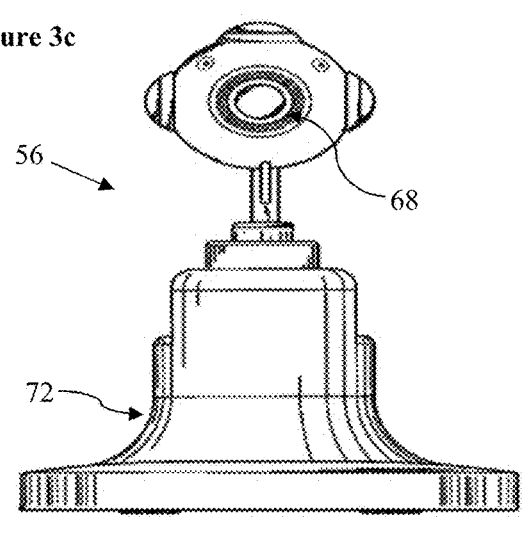
Figure 3G:
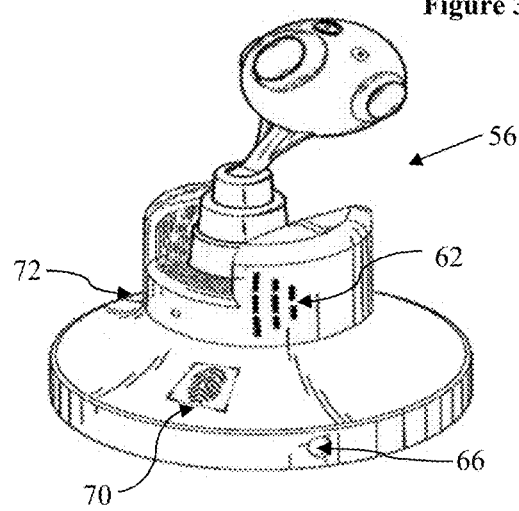

In FIG. 1e, if the visitor 12 has selected the option to call a particular apartment for example, then the visitor 12 may be presented, via the user interface 32 with a keypad in which they are able to enter the apartment number to call. A similar keypad may be provided as per FIG. 1f, which allows a visitor 12 to enter a passcode in order to be able to unlock the door 14.

It is noted that the keypad could be provided with audible or visual clues as to its usage which may improve the utility of the device for, for example, the visually-impaired or deaf. Furthermore, since there is a wireless communication means, the smart door apparatus 10 could also be used to permit three-way, four-way or conference calling facilities between more parties than just the visitor and the occupant of the property.

It will be appreciated that a keypad is merely one possible option for allowing access through a door 14 of a smart door apparatus 10. It may, for example, be possible to provide one or more biometric sensors associated with the door 14. Facial recognition via the cameras 22 may be one form of biometric recognition, but other possible biometric sensors could include: a fingerprint sensor; a thermal imaging sensor; an iris scanning sensor: and a facial recognition sensor. The biometric sensors could feasibly be a requirement of access through the smart door apparatus 14, as this would force criminals or other undesirables to register their biometric data with the smart door 14, increasing their risk of being apprehended in the future. The primary purpose of biometric sensors on the internal side of the door 14 would be to ensure that only authorised users are accessing the control functionality of the smart door apparatus 10, thereby preventing or limiting unauthorised usage.

The exterior display screen 20 could also be used to record messages left by individuals at the smart door apparatus 10 in the event that there is no answer from the door 14.

Other monitoring means could also be provided, either provided as part of existing sensors or independently, and these could include any or all of: an electronic head counter; light meter; decibel or noise level meter; smoke alarm; and/or shock sensor.

More detail of the smart door apparatus 10 is illustrated in FIGS. 2a to 2c. The door 14 can be seen in detail in FIG. 2a. The cross-section through the smart door apparatus 10 in FIG. 2b illustrates more of the features of the smart door apparatus 10.

There may be provided a control processor 34, such as a microprocessor as CPU, associated chipset, and logic circuit, which is embedded into the door body 16 and which includes a power supply 36. There is also a wireless communication means arranged to receive information regarding the person on the external side of the door from a remote source, preferably formed as a wireless communications module 38 of the processor 34, and an identity verification circuit 40 which is in communication with the wireless communication module 38 which is able to provide verification information to a user of the smart door apparatus 10 regarding the identity of the visitor 12. The processor 34 may include a memory storage device 42 for storing relevant data relating to visitors 12. The processor 34 may also be provided with a dedicated cooling system 41, and the entire processor assembly may be contained within a complete cavity 44 positioned inside the door body 16. This cooling may be provided as a cool air intake at the bottom of the door 14, which flows through the cavity 44 and out of a top of the door 14. However, the cooling system 41 could include any or all of: air control fans: air heatsinks; heat pipes; a compressor-based cooling system; or CPU cooling blocks. The door body 16 acts as a weatherproof shell for the electronic components of the smart door apparatus 10. The processor 34 may feasibly be loaded with artificial intelligence software to act to greet individuals at the door 14, based on a verification of their identity.

The wireless communications module 38 may be networked activated and communicable via the internet, for example via any one of the following means: Wireless Broadband, Fixed Wireless Access (Wi-Fi, WiMAX), Mobile Broadband (3G, 4G, 5G), Satellite and Fixed Line Broadband DSL (ADSL, SDSL), Cable and Hybrid Fibre (DOCSIS, FTTC, G.fast), Fibre Optic (FTTH, FTTP, FTTB), etc.

The exterior display screen 20 may be provided in an outwardly-projecting frame 46 of an exterior surface of the door 14, thereby allowing the exterior display screen 20 to be completely receivable within the door body 16. There may also be provided an interior display screen 48 which may be mounted within a corresponding outwardly-projecting frame 50 on an interior surface of the door 14. The interior display screen 48 which is in communication with the camera or cameras 22 to display an image of the visitor 12 to a user of the smart door apparatus 10.

The interior display screen 48 may provide direct tactile and visual interaction between a door profile holder and the smart door apparatus 10, allowing for communication with others and smart devices, potentially via an associated website and/or software application. From the interior display screen 48, a user may be able to raise an alert, should they be in distress, deploy the unmanned aerial vehicles 26, share information with others, communicate with family and friends, respond to electronic communications, pay relevant bills such as utility bills for the property, display warnings to an individual on the other side of the door, and/or manage their user profile.

There may be provided an interior UAV mount 52 which is positioned on the interior surface of the door 14, and as can be best seen in FIG. 2c. An indoor unmanned aerial vehicle 54 may then be provided which can be launched from the door 14 in order to provide image capture or video capture of the interior of the premises.

FIGS. 3a to 3g show a smart projector device 56 which may be associated with the smart door apparatus. The smart projector device 56 may comprise any and/or all of: a, preferably 360° panoramic, image capture device 58, at least one motion sensor 60, audio speaker 62, microphone 64, power supply 66, image projector 68, wireless or wired communication means to communicate with the door 14, and biometric reader 70, such as the depicted fingerprint reader. Some of these features may be provided in a dedicated base 72 for the smart projector device 56, as can be seen in FIGS. 3b, 3c, 3f and 3g.

The smart projector device 56 is arranged so as to at least receive information from the door 14 and to project an image taken from the door cameras 22 onto an appropriate screen or surface. This will allow the user of the smart door apparatus 10 to visually identify a visitor 12 remotely from the door 14. The smart projector device 56 may be configured so as to determine a relative position of the user and then to project the image of the visitor 12 accordingly.

Figure 4A:
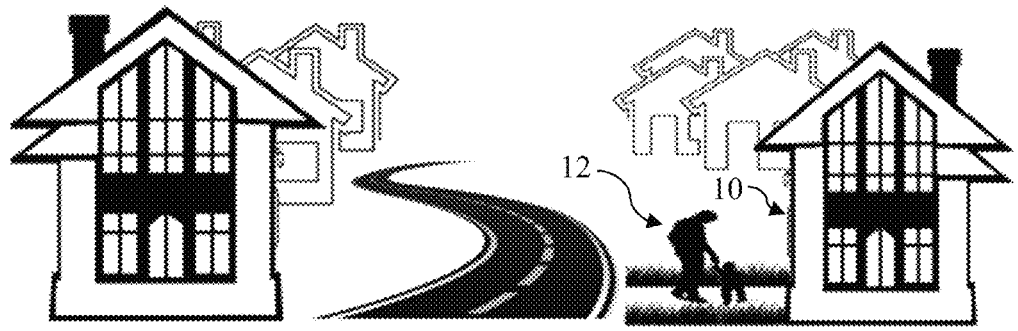

The smart door apparatus 10 is shown in use in FIGS. 4a to 4d. In this scenario, a known individual approaches the door 14, as illustrated in FIG. 4a, and attempts to gain access, presumably by activation of the doorbell on the exterior display screen 20. The cameras 22 are able to capture an image or live video stream of the visitor 12.

Figure 4B:
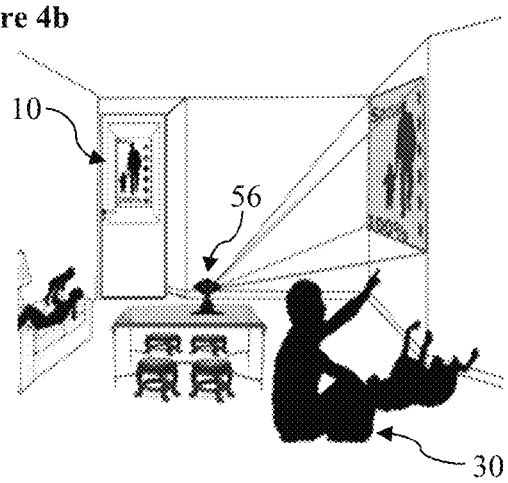

The smart door apparatus 10 is able to relay this image to one or more displays, as can be seen in FIG. 4b. The live image is shown both on the interior display screen 48 and is also wirelessly communicated to the smart projector device 56, which projects an image or the five stream of the visitor 12 onto a usable surface inside the premises.

Figure 4C:
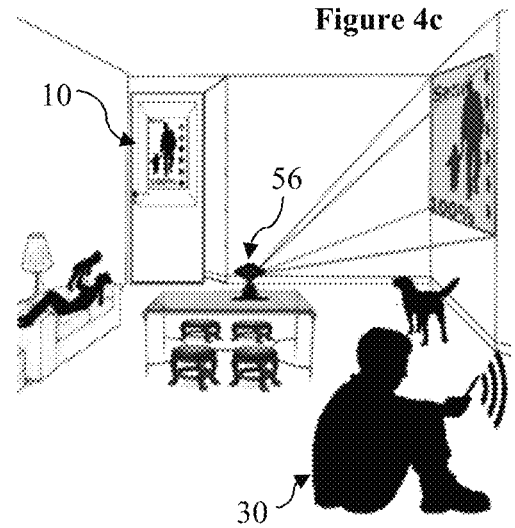
Figure 4D:
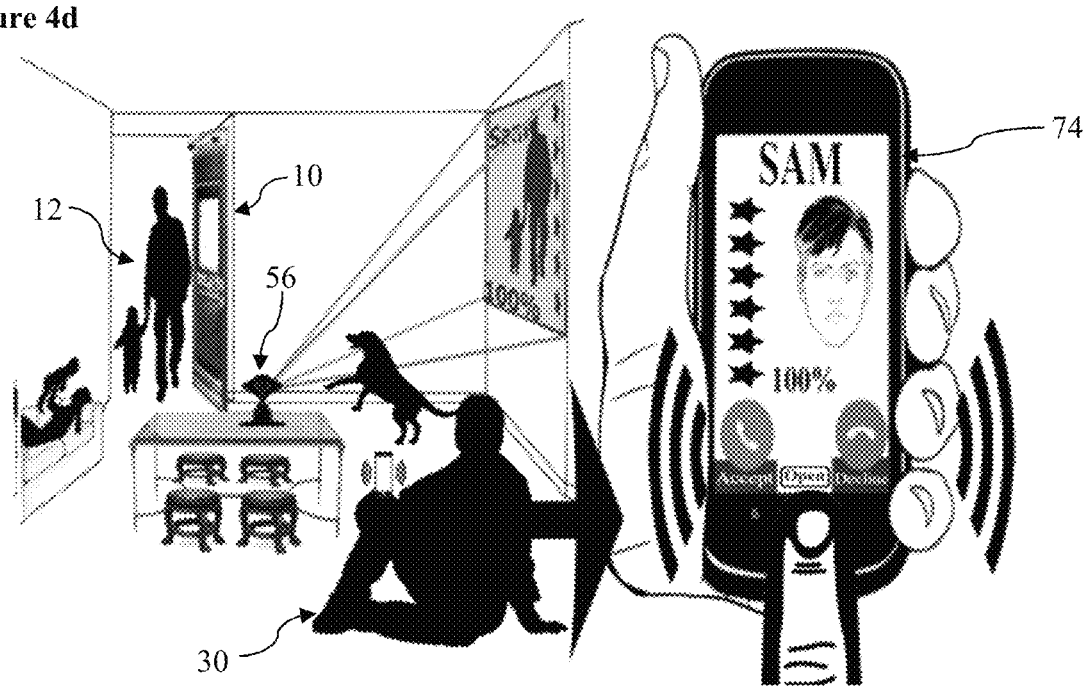

As can be seen in FIG. 4c, the wireless communications module 38 may be configured to communicate with an appropriate software application which may be loaded onto the user's 30 smart device 74. This may provide the user 30 with the ability to determine the identity of the visitor 12 and remotely allow access to the premises via the smart device 74, as can be seen in FIG. 4d.

Figure 5A:
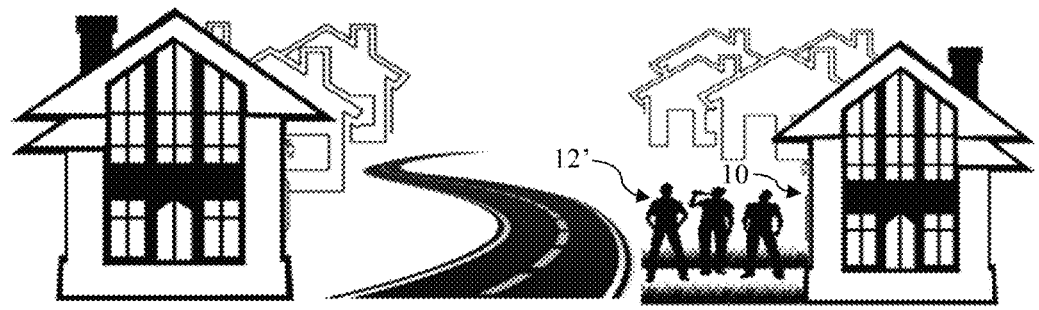
Figure 5B:
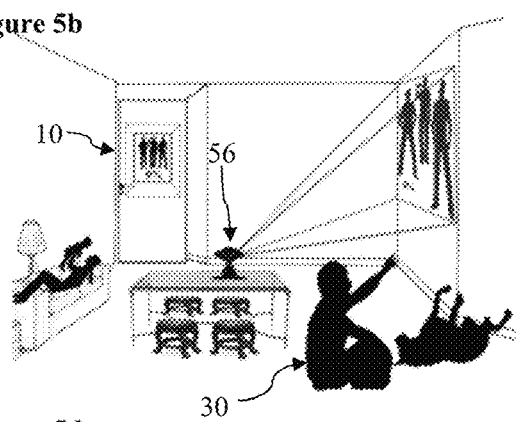

A different scenario is illustrated in FIGS. 5a to 5f. In FIG. 5a, a group of unknown individual 12' are approaching the smart door apparatus 10, and have been imaged; by the cameras 22. The image and/or live stream of the group of unknown individuals 12' is displayed on the interior display screen 48 and/or the smart projector device 56, and the user 30 is alerted to the group of unknown individuals 12', FIG. 5b.

Figure 5C:
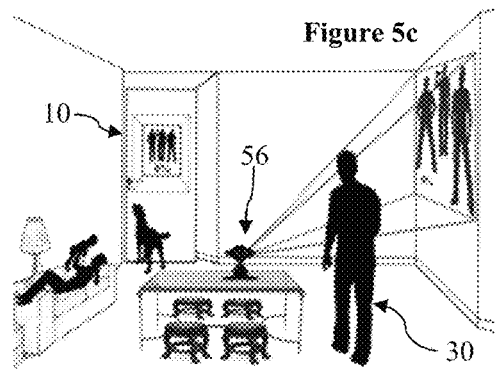
Figure 5D:
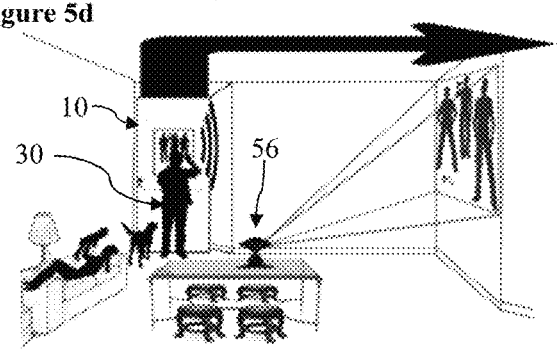
Figure 5E:
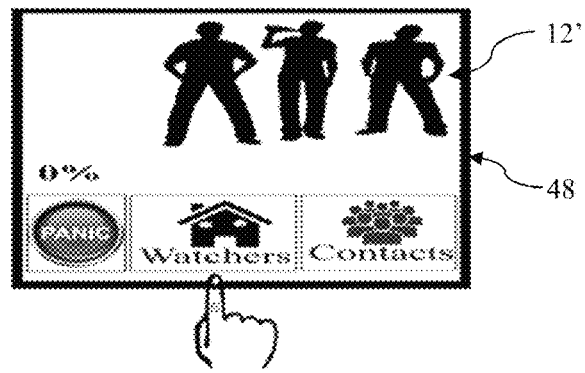
Figure 5F:
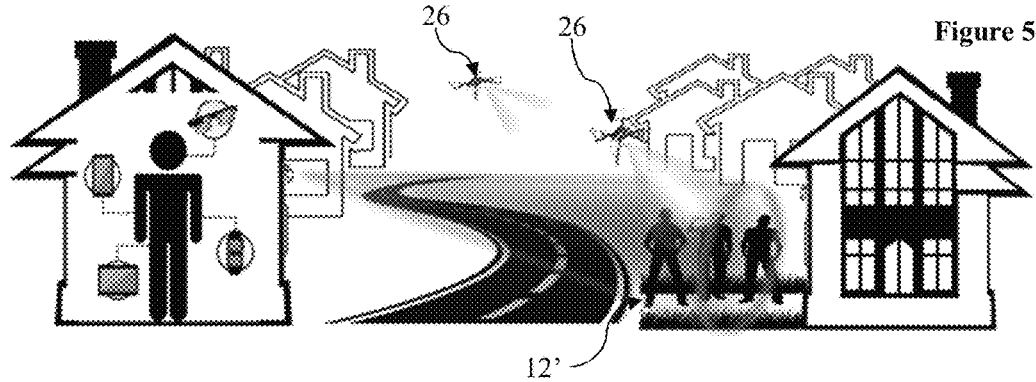

In FIG. 5c, the user 30, being unable to visually identify the group of unknown individuals 12' decides to investigate the situation further. Following visual inspection of the interior display screen 48, FIG. 5d, they decide to deny access to the premises for the group of unknown individuals 12'. On the interior display screen 48, they then decide to monitor the group of unknown individuals 12 in more depth, FIG. 5e, and issue commands from the interior display screen to the unmanned aerial vehicles 26 are freed from the UAV dock 28, and may be automatically controlled by the processor 34 to monitor the group of unknown individuals 12', for example, for a predetermined time or until the group of unknown individuals 12' move on, as seen in FIG. 5f.

The unmanned aerial vehicles 26 may be equipped with any or all of a camera, light, sensors, location means such as GPS, a speaker and/or microphone, thereby providing wide ranging monitoring capabilities. Furthermore, whilst the unmanned aerial vehicles 26 will be associated with respective UAV docks 28, they may be provided with software which allows them to patrol a wider area, acting as a neighbourhood watch, and/or may be associated with control software which means that they can be summoned to a particular location, for example, when summoned by an individual in distress having appropriate software on their own smart device. As can be seen in FIG. 5f, the group of unknown individual 12' have actually been detected by a smart door apparatus 10 which is not associated with the property which is being visited, and as such, the unmanned aerial vehicles 26 from a neighbouring smart door apparatus 10 have been instructed to monitor the group of unknown individual 12'.

It will be appreciated that the unmanned aerial vehicles 26 do not only need to be operational in the exterior of the property including the smart door apparatus 10. The unmanned aerial vehicles 26 could, for example, be used by a landlord to monitor the status of a property, by activating the unmanned aerial vehicles 26 to patrol the property in order to determine whether repair or maintenance work is required in the property, or alternatively to provide an inventorisation service following vacation of a property.

Figure 6:
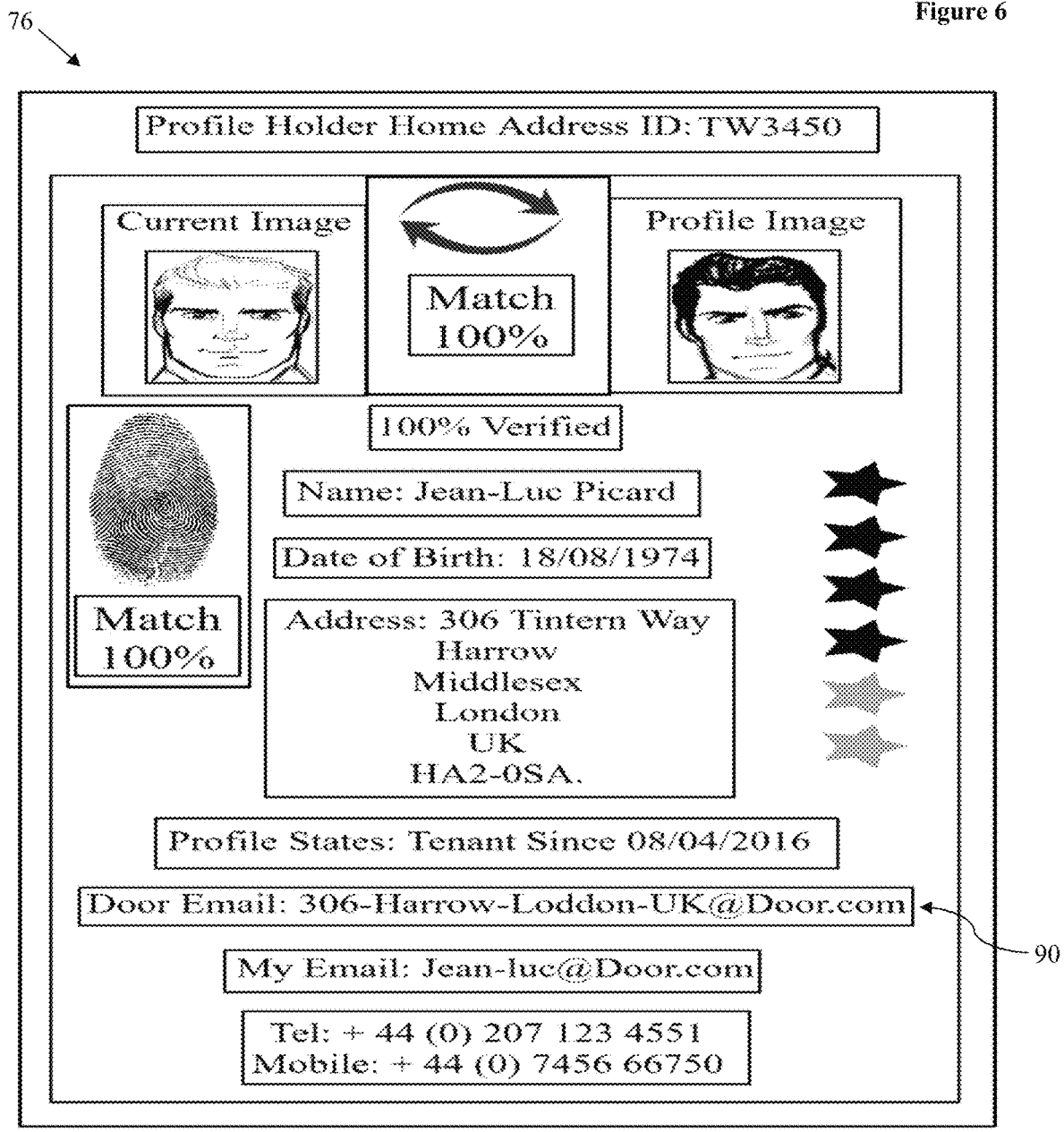
FIG. 6 shows one embodiment of a user interface for an identity verification display for a smart door apparatus in accordance with the first aspect of the invention.

Of course, the smart door apparatus 10 described above only describes the most basic function of the overall system. The smart door apparatus 10 can be used to verify a visitor's 12 identity to the user 30 in a more meaningful manner. A depiction of a potential visitor profile 76 is illustrated in detail in FIG. 6.

Any individual may have a unique profile which may be stored in the memory storage device 42 associated with the processor 34, or may more preferably be stored in a remote location which can be accessed via the wireless communications module 38 of the smart door apparatus 10.

Data which may be stored in the visitor profile 76 may include a profile image, the name of the visitor, the date of birth, a current address, telephone number, email address, and/or biometric data, such as a fingerprint. Other relevant data may also be stored.

In the first instance, to determine an identity of a visitor 12, the smart door apparatus 10 may attempt to compare a real-time image of the visitor 12 against a recorded image, if the visitor 12 has a visitor profile 76, preferably using facial recognition software on the identity verification circuit 40. This may allow a verification status of the visitor 12 to be determined and proffered to the user 30 to ensure that the visitor 12 is indeed who they are claiming to be, and/or to permit automated access to be granted to verified individuals.

Figure 7:
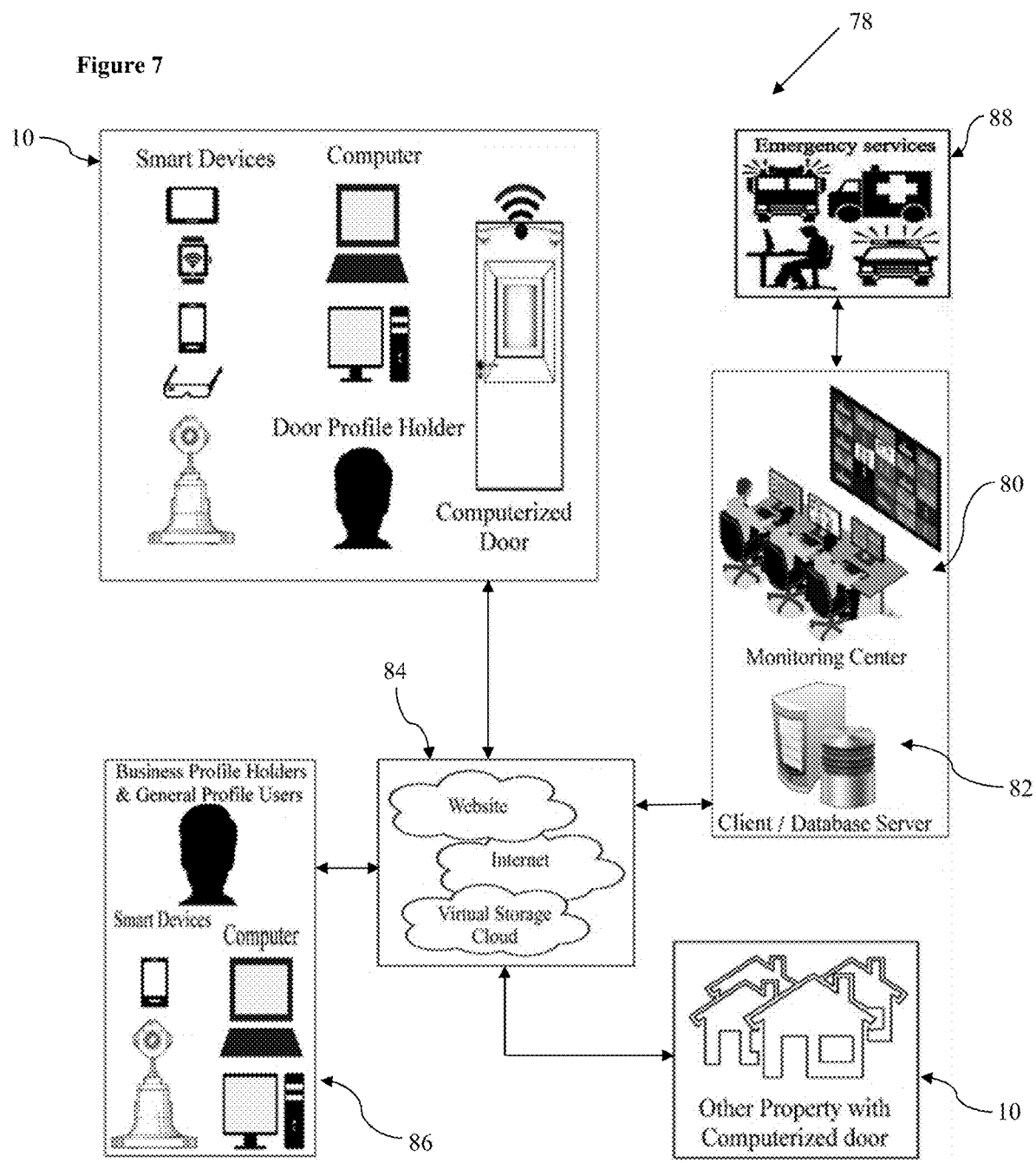
FIG. 7 shows one embodiment of a smart door network system in accordance with the fourth aspect of the invention.

A verification system 78 for individuals using smart door apparatuses 10 is illustrated in FIG. 7. The smart door apparatus 10 may be networked so as to be communicable with a plurality of other devices or systems.

In the first instance, the smart door apparatus 10 may be linked to a monitoring centre 80, having a client and/or database server 82 on which is stored a plurality of visitor or other individual profiles 76. Whilst important visitor profiles 76 may be stored in the memory storage device 42 in the smart door apparatus 10, it will be apparent that it may be extremely useful to collate information from a plurality of sources in order to improve the identification and verification of persons attempting to gain access to a premises via appropriate doors 14. This may improve the ability for users 30 to identify con artists or criminals on their doorsteps.

Furthermore the monitoring centre 80 may be accessible via a website or software application 84, which is able to provide a suitable user interface to a user, and other users of an overall smart door network system also having smart door apparatuses 10 may also access user profiles via the same user interface. Businesses 86 may also access the system in a similar manner. The website and/or software application 84 may act as a central point of contact for a tenant or landlord, for example.

The monitoring centre 80 can be used to perform a number of tasks for the verification system 78. Not only can profile data be stored and relayed to individual smart door apparatuses 10, but the monitoring centre 80 can communicate with third party data sources in order to find out more information about particular users. In the example of a tenant and landlord arrangement, the monitoring centre may be able to perform additional background checks on a prospective tenant. The monitoring centre 80 can also act as a point of first contact in an emergency. For instance, where an alarm has been activated by an individual smart door apparatus 10, the monitoring centre 80, being in communication with the smart door apparatus 10, may alert the relevant emergency services 88, for example.

In the event of a distress call being sent from one smart door apparatus 10, or the identification of a known dangerous individual by a given smart door apparatus 10, it is noted that the monitoring centre 80 could communicate alerts to nearby smart door apparatuses 10, for example, which would allow other individuals to secure their properties and safeguard their persons from threat.

The monitoring centre 80 is able to provide support and a variety of services and functions to the smart door apparatuses 10, user profile holders, business profile holders, and general profile holders, and to both the website and/or software application 84, and any cloud storage facilities. The monitoring centre 80 may contain a data centre monitoring, identity provider service, which identifies users when registering to interact with the verification system 78. The monitoring centre 80 can check provided documents to ensure that supplied information is valid, and can check other records to which they have access, such as from credit reference agencies and from government and private sectors.

The monitoring centre 80 may also be responsible for uploading advertisements onto the smart door apparatus 10 along with potential information relating to offers and deals which may be relevant to the occupant, in addition to information provided from emergency and/or infrastructure services regarding incidents in the local area or wider area. For example, images of wanted suspects could be disseminated via smart door apparatuses 10.

The monitoring centre 80 may use various sensors within the smart door apparatus 10 to monitor the performance of the relevant devices of the smart door apparatus 10 and their respective operating conditions, allowing an owner to provide servicing and/or preventative maintenance on demand.

One of the most potent possible uses of the smart door apparatus 10 is in the verification of an individual's identity as part of a tenancy agreement between a landlord and a tenant. A landlord may choose to remotely verify the identity of a tenant or prospective tenant without necessarily requiring extensive background checks, provided that the tenant has an existing user profile within the smart door apparatus 10 or within a network of smart door apparatuses 10 forming a complete tenant verification system across a plurality of different properties which can communicate via the monitoring centre 80 and/or client and/or database server 82.

Each of the landlord and prospective tenant may have respectively a landlord profile and a tenant profile which is stored either locally at the smart door apparatus 10, or more preferably, remotely at the monitoring centre 80. All registered users will could have their profiles stored remotely, allowing each smart door apparatus 10 to communicate with the monitoring centre 80 when an individual's identity has been recorded and is due for verification. This provides the network of smart door apparatuses 10 with the greatest possible scope for correctly verifying the identities of people at any given smart door 14.

Any or all profiles which are associated with a smart door apparatus 10 may be categorised by type, of which, landlord profiles and tenant profiles are only two. Other possible profiles may include lodger, occupant, short-stayer, business, visitor, and others will be apparent to the skilled person. The possible actions related to the smart door apparatus 10 may be restricted based on the profile level of the particular user.

A tenant profile may contain historical data relating to the tenant, which may be determined from existing data which has been digitised, or may be collected as the tenant becomes resident at a greater number of properties which have smart door apparatuses 10. The tenant profile will also comprise characteristic identifying data relating to the tenant, which may include, but may not be limited to; image data; biometric data such as fingerprint data; name; gender; home address; date of birth; email address; telephone number; etc. The tenant profile may further comprise a tenant rating, which may be determined from data collected from previous tenancies, such as loss of deposit, previous landlord feedback, and/or letting agent feedback. This could be displayed to a potential landlord as part of an automated background check on a prospective tenant.

A landlord will contain similar characteristic data to the tenant profile, but may also comprise a landlord rating, which may be collected from historical data relating to the landlord and/or the property, which may include tenant satisfaction ratings, previous rent information, eviction rates, etc. The landlord profile could feasibly be created on installation of the smart door apparatus 10 as part of the set-up procedure, thereby associating the smart door apparatus 10 with the landlord or property. As part of the installation process, the identity of the landlord may be verified by a third party, such as the installer, to ensure that the landlord is indeed the rightful holder of the property.

To rent or let a property, a landlord may be able to advertise the property via the landlord profile on a dedicated website, which may be operated via the monitoring centre 80, for example. The landlord profile may be associated with information regarding the property, such as images captured via the smart door apparatus 10, for instance, via the unmanned aerial vehicles 26, information regarding the rent, as well as the landlord rating which is present on the landlord profile. A prospective tenant would then be able to view the landlord profile on the website, although alternative advertising means could also be provided, for example, via a dedicated software application.

In order for a tenant and landlord to come to an agreement regarding the lease or rental of the property, the verification system 78 can be used in order to determine both the identities of the landlord and tenant. This provides all parties with certainty regarding the relative merits of the other party. The landlord can use the tenant profile as a form of initial background check, and the monitoring centre 80 could be used to draw additional information regarding the viability of the tenant for a particular tenancy. For example, the monitoring centre 80 could utilise extensive information to rapidly determine whether an individual has, for instance, right to remain in the country for the duration of the tenancy agreement.

Once an agreement has been reached, the smart door apparatus 10 of the property itself could be utilised to ensure that the correct tenant is indeed occupying the property. For example, the processor 34 of the smart door 14 could be provided with a contract generation and signing circuit which is in communication with the identity verification circuit 40.

A tenant could approach the smart door 14, and, in order to activate their tenancy agreement, could be displayed with a contract generated by the contract generation and signing circuit of the processor 34. The smart door apparatus 10 is able to verify the identity of the tenant signing the contract at the exterior display screen 20 using, for example, the plurality of cameras 22. Once the contract has been signed, and the tenant's identity has been verified, then the tenant can be provided with access to the property for the duration of their tenancy agreement.

The ability to verify the tenant's identity at the point at which they occupy the property significantly reduces the likelihood that a bogus tenant may occupy a property, ensuring that a landlord is fully aware of the identity of the tenant at the point of permitting authorisation to access the property. The association of contact information with the profiles of particular individuals means that it may be possible for a visitor to the smart door apparatus 14 to utilise the exterior display screen 20 to contact the occupant. For example, if a telephone number is available to the smart door apparatus 10, a visitor may be provided with the option to call the user 30 in an attempt to effect remote authorised access to the property, regardless of the current location of the user 30.

On initialisation of the smart door apparatus 10, the processor 34 may be associated with a unique identifier, as well as a standardised door email account 90. This door email may be made accessible to all profile holders within the premises, which may allow them to receive, retrieve, read, share, copy, send and correspond with any sent information to the smart door apparatus 10. This may allow the smart door apparatus 10 to also act as an electronic mailbox for the property, and could be associated with, for example, the utility service providers for the property. This provides a paperless mechanism by which the utility company may contact individuals at the property, whilst being able to cope with the natural churn of occupants for a rental property. Indeed, one of the greatest burdens associated with moving house is the requirement to transfer one's personal details, such as voter registration, setting up new utility company accounts, registering with a doctor, etc. The smart door apparatus 10 could be used to centralise all of this information within a user profile, and then automatically generate and/or amend the necessary information with the relevant parties on transition to a new dwelling. The user profile could also readily act as a certifiable proof of address, due to the verification of the user's identity, which is otherwise difficult to achieve electronically. The certification of the proof of address could be performed locally, for example, by the provision of an address verification circuit which is in communication with the identity verification circuit for providing a certified proof of address for a user of the smart door apparatus associated with a property.

The smart door apparatus 10 may also form part of a property management system in conjunction with at least one property sensor which is positionable inside a property and is in communication with the wireless communication means 38 of the smart door apparatus 10. The at least one property sensor can be adapted to optically image at least a portion of the property for inventorisation and/on to determine a state of repair of the property. The property sensor could be one or more cameras which are positioned inside the property, or could be an activatable indoor unmanned aerial vehicle 54. The flight path of such an unmanned aerial vehicle 54 could be pre-programmed at the point of installation of the smart door apparatus 10. Alternatively, the smart projector device 56 could be used for this purpose.

The handle 18 may also be provided so as to be smart in its own right, as can be seen from FIGS. 8a and 8b. The internal handle 92 of the door handle 18 may be configured so as to have a deadbolt or similar locking mechanism which is capable of receiving commands from, for example, the processor 34 of the smart door apparatus 10, which may be significant where an individual is attempting to gain unauthorized access to the premises.

The handle 18 provides a user with the ability to lock the door 14 securely during an emergency, and in turn also potentially raise an alarm. The interior handle 92 may be provided with a secondary controller 94 which is in communication with a wireless communications circuit 96, which may be powered using a dedicated handle power supply 98, such as a stack of batteries as shown, ensuring that a power outage will not compromise the handle 18. One or more audio or visual alarms 100 may also be provided.

Use of the interior handle 92 during an emergency can prevent anyone from opening the door from the outside even in the event that the person on the outside holds keyless access ability; this can be considered to be a deadbolt function of the interior handle 92. To activate the door lock, the interior handle 92 can be rotated into a vertical condition, that is, to a 'twelve o'clock' position for example, as shown, which will preferably disengage the external handle 102 from the opening mechanism of the door 14. Doing so can not only render the external handle 102 inoperable, but can also automatically send an alarm to the emergency services and/or monitoring centre 80, for example. Activation of the interior handle 92 may also automatically activate the unmanned aerial vehicles 26 and/or the camera 22 to monitor the wider situation outside of the door 14 extensively.

The door lock 106 may be activated by the interior handle 92 by the use of a reverse lever function, such as in the rotation of the handle 92 into the vertical condition described above, or could alternatively be activated by pulling outwardly on the interior handle 92.

The secondary controller 94 may be provided with a timing circuit 104. This may allow the period of disengagement of the external handle 102 to be set for a predetermined period, for example, fifteen minutes. This may ensure that the door 14 is not disabled for too long, whilst sufficiently frustrating any potential intruder to such a de-gee as to likely ensure that they give up and leave the premises. The interior display screen 48 may be in communication with the secondary controller 94 so as to be able to display to the user 30 a total remaining time until the external handle 102 becomes reactivated.

As the interior handle 92 includes a dedicated secondary controller 94, it may be provided with additional functional aspects which are independent of the main smart door 14. For example, there may be a dedicated wireless communication means associated with the secondary controller 94 so as to permit it to automatically send an alarm or distress signal independently of the smart door 14. Preferably, the controller is provided in association with a memory storage device which is able to store at least one contact profile containing contact details of one or more individuals or third parties, such as friends, family, or the monitoring centre. In the event of activation of the deadbolt, the wireless communication means may be activated to automatically contact one or more of the individuals or third parties based on their contact details. This could be as simple as sending an alert, or could relay live video or audio feeds sous to assist with identification of the threat posed to the user.

Additionally, or alternatively, a microphone and/or speaker arrangement may be provided in the interior and/or exterior handles 92, 102, thereby allowing the user 30 to communicate with a person on the other side of the door. If the alarm has been activated, via activation of the door lock 106 by a user in distress, then the secondary controller 94 may automatically relay any images, which may be captured by one or more dedicated image capture devices associated with the exterior door handle, of the intruder to the emergency services, for example, via the monitoring centre 80, in order to provide for identification.

The secondary controller 94 may also be provided with at least one biometric and/or optical sensor which is independent from that of the smart door 14, and which is only activatable in the event of the activated of the door lock 106.

There may also be provided a mechanism for extending the period for which the external handle 102 is deactivated. This may be achieved, for example, by repeating the action of moving the internal handle 92 to the vertical condition, in order to restart the timing circuit 104.

An exploded cross-section through the smart door 14 is shown in FIG. 8c. The door lock 106 and interior handle 92 may be provided in direct communication with a controller 108 which allows the user to unlock the smart door 14 on command, if any threat has dissipated. The controller may be a physical switch, as shown, but could alternatively be a keycode or pass, or a physical key on the interior side of the door 14.

It will be appreciated that the presence of the secondary controller 94 allows for commands to be sent and received directly to the interior handle 92, and therefore it may be possible for remote control of the door lock 106 via a user's smart device, for example, to be utilised.

As part of either the interior handle 92, or indeed the smart door apparatus 10 as a whole, it may be possible for a user 30 to pre-program or pre-authorize access through the door 14 for given individuals. When the identity of an individual at the door 14 is verified by the identity verification circuit 40, then it may be possible to determine whether the individual is authorised for access, either locally using the processor 34 and/or secondary controller 94, or remotely via the monitoring centre 80. This may, for example, allow a user 30 to remotely provide access to a property to, for example, a delivery person. Upon identification of the individual by the identity verification circuit 40, information regarding the individual may be displayed to the user 30, including, but not limited to, name, telephone number and image. Furthermore, it may be possible to only permit access to the property not only upon identification of the individual by the identity verification circuit 40, but also by requiring the individual to input a passcode or similar authentication key, thereby improving the security of the remote access authorisation procedure.

An alternative embodiment of a smart door apparatus is shown in FIGS. 9a(i) to 9b(ii), and is indicated globally at 210. Identical or similar components of this embodiment will be identified using identical or similar reference numerals to those used in respect of the first aspect of the invention, and further detailed description will be omitted for brevity.

In this embodiment, many of the smart features of the apparatus are no longer mounted to the door body 216; instead, the camera 222, unmanned aerial vehicles 226, and exterior display device 220 are mounted to a door frame 211 associated with the door 214. This arrangement negates the bulky computing components of the first embodiment of the invention from needing to be installed inside the door body 216, which may make the door 214 less prone to an attack to incapacitate the smart features.

The interior display 248 in this embodiment is not a screen, as per the first embodiment, but may be a projector display instead. Here, the captured image or video feed is projected onto the interior surface of the door 214, indicating to a user that there is a group of unknown individuals 12' at the door 214.

FIG. 10 shows a further embodiment of a door handle, indicated globally at 318. Identical and similar features of this door handle 318 will be referred to using identical and similar reference numerals to those used in FIGS. 8a to 8c, and further detailed description is omitted for brevity.

The interior door handle 392 is shown, and exemplary positions of a microphone 301 and speaker 303 are shown, which would allow a user 30 to communicate with the visitors 12 and/or a monitoring centre 80 or similar third party. To improve communications for the user 30, an image capture device 305, such as a camera, may be provided, to allow for video communications with the user 30. Such an image capture device 305 may be embedded in the interior door handle 392 itself.

It is therefore possible to provide a smart door apparatus which is capable of verifying the identity of an individual or individuals who present themselves at the door. The apparatus allows for a user to remotely permit access to the property for the individual, monitor the activities of the individual, and/or determine more information regarding the individual before deciding to permit or deny access to the property. There are lots of potential uses for the smart door apparatus, particularly in facilitating landlord-tenant interactions, as well as providing an improved security door, particularly in scenarios where an individual may attempt forced entry to a property, via the provision of an improved door locking device.

The words 'comprises/comprising' and the words 'having/including' when used herein with reference to the present invention are used to specify the presence of stated features, integers, steps or components, but do not preclude the presence or addition of one or more other features, integers, steps, components or groups thereof.

It is appreciated that certain features of the invention, which are, for clarity, described in the context of separate embodiments, may also be provided in combination in a single embodiment. Conversely, various features of the invention which are, for brevity, described in the context of a single embodiment, may also be provided separately or in any suitable sub-combination.

The embodiments described above are provided by way of examples only, and various other modifications will be apparent to persons skilled in the field without departing from the scope of the invention as defined herein.

What is claimed is:

1. A door locking device for a smart door apparatus, the door locking device comprising: an interior door handle positionable on an interior side of a door; an exterior door handle positionable on an exterior side of the door; a lock for the door which is coupled to the interior door handle, the lock having a deadbolt which is activatable by actuation of the interior door handle; a controller for automatically generating a distress signal in the event of activation of the deadbolt; and a wireless communication module associated with the controller, the wireless communication module automatically transmitting the distress signal in the event of activation of the deadbolt, further comprising a memory storage device associated with the controller, the memory storage device being adapted to store at least one contact profile containing contact details for the wireless communication module to automatically contact in the event of activation of the deadbolt.

2. The door locking device as claimed in claim 1, the controller further comprising a timing circuit, the controller automatically disengaging the deadbolt after a predetermined duration defined by the timing circuit.

3. The door locking device as claimed in claim 2, wherein the predetermined duration is re-activatable upon repeated actuation of the interior door handle.

4. The door locking device as claimed in claim 2, further comprising at least one indicator element which is indicative of a remaining duration until disengagement of the deadbolt.

5. The door locking device as claimed in claim 1, wherein the activation of the deadbolt is effected by counter-rotation of the interior door handle into a vertical or substantially vertical condition.

6. The door locking device as claimed in claim 1, further comprising an override element for manual override of the deadbolt of the device.

7. The door locking device as claimed in claim 1, wherein the controller is mounted inside the interior door handle, and further comprising a dedicated power supply for the controller which is also mounted inside the interior door handle.

8. The door locking device as claimed in claim 1, further comprising an image capture device associated with the exterior door handle to permit a user to monitor an individual at or adjacent to the exterior door handle.

9. The door locking device as claimed in claim 1, further comprising an image capture device associated with the interior door handle to permit video communications with the user.

10. The door locking device as claimed in claim 9, wherein the image capture device is mounted in the interior door handle.

11. The door locking device as claimed in claim 1, further comprising a communications means to permit at least audio communication between the interior and exterior sides of the door.

* * * * *